United States Patent
Chino et al.

(10) Patent No.: US 12,024,615 B2
(45) Date of Patent: Jul. 2, 2024

(54) SILANE COUPLING AGENT COMPOSITION COMPRISING SILANE COMPOUND AND PROTEIN MODIFYING AGENT, AND RUBBER COMPOSITION COMPRISING THE SAME

(71) Applicant: ENEOS Corporation, Tokyo (JP)

(72) Inventors: Keisuke Chino, Tokyo (JP); Makoto Ashiura, Tokyo (JP)

(73) Assignee: ENEOS Corporation, Tokyo (JP)

(*) Notice: Subject to any disclaimer, the term of this patent is extended or adjusted under 35 U.S.C. 154(b) by 390 days.

(21) Appl. No.: 17/618,291

(22) PCT Filed: Jun. 5, 2020

(86) PCT No.: PCT/JP2020/022306
§ 371 (c)(1),
(2) Date: Dec. 10, 2021

(87) PCT Pub. No.: WO2020/250824
PCT Pub. Date: Dec. 17, 2020

(65) Prior Publication Data
US 2022/0380575 A1    Dec. 1, 2022

(30) Foreign Application Priority Data

Jun. 10, 2019   (JP) ................. 2019-107826

(51) Int. Cl.
*C08K 5/548* (2006.01)
*B60C 1/00* (2006.01)
*C07F 7/18* (2006.01)

(52) U.S. Cl.
CPC ............... *C08K 5/548* (2013.01); *B60C 1/00* (2013.01); *C07F 7/1804* (2013.01)

(58) Field of Classification Search
CPC .................................. C08K 5/548; B60C 1/00
(Continued)

(56) References Cited

U.S. PATENT DOCUMENTS 5,534,599 A   7/1996  Sandstrom et al.
6,350,797 B1  2/2002  Weller
(Continued)

FOREIGN PATENT DOCUMENTS

CN   103627040 A   3/2014
CN   105199171 A   12/2015
(Continued)

OTHER PUBLICATIONS

The International Bureau of WIPO, International Preliminary Report on Patentability in International Patent Application No. PCT/JP2020/022306 (Dec. 14, 2021).
(Continued)

*Primary Examiner* — Deve V Hall
(74) *Attorney, Agent, or Firm* — Leydig, Voit & Mayer, Ltd.

(57) ABSTRACT

Disclosed is a rubber composition which suppresses poor mixing or poor dispersion from occurring between an organic polymer material derived from natural rubber and an inorganic material such as silica and exhibits excellent viscoelastic properties, and a silane coupling agent composition used in the same. Also disclosed is a silane coupling agent composition comprising a protein modifying agent and a silane compound represented by Formula (1):

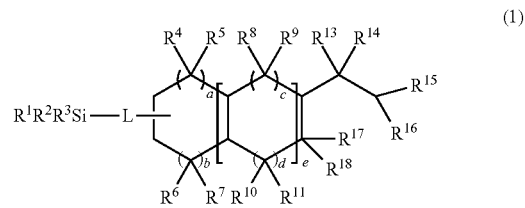

wherein each of the variables is as defined herein.

22 Claims, 7 Drawing Sheets

(58) Field of Classification Search
USPC .......................................................... 524/262
See application file for complete search history.

(56) References Cited

U.S. PATENT DOCUMENTS

| | | |
|---|---|---|
| 2008/0306213 A1 | 12/2008 | Jiang et al. |
| 2009/0137730 A1 | 5/2009 | Kameda et al. |
| 2016/0102193 A1 | 4/2016 | Matsuura et al. |

FOREIGN PATENT DOCUMENTS

| | | |
|---|---|---|
| JP | H08-259736 A | 10/1996 |
| JP | H11-335381 A | 12/1999 |
| JP | 2004-099696 A | 4/2004 |
| JP | 2010-111722 A | 5/2010 |
| JP | 2010-529252 A | 8/2010 |
| JP | 2013-043926 A | 3/2013 |
| JP | 2013-129696 A | 7/2013 |
| JP | 2014-177429 A | 9/2014 |
| JP | 2016-074844 A | 5/2016 |
| JP | 2016-113515 A | 6/2016 |
| WO | WO 2007/132909 A1 | 11/2007 |
| WO | WO 2016/181679 A1 | 11/2016 |
| WO | WO-2017146103 A1 * | 8/2017 ............... B60C 1/00 |
| WO | WO 2017/188411 A1 | 11/2017 |

OTHER PUBLICATIONS

European Patent Office, Extended European Search Report in European Patent Application No. 20823143.1 (May 23, 2023).
Japan Patent Office, Office Action in Japanese Patent Application No. 2021-526067 (Nov. 10, 2023).
Taiwan Intellectual Property Office, Office Action in Taiwanese Patent Application No. 109119475 (Sep. 19, 2023).
Sarkawi et al., "The influence of non-rubber constituents on performance of silica reinforced natural rubber compounds," *European Polymer Journal*, 49(10): 3199-3209 (2013).
Japanese Patent Office, International Search Report in International Patent Application No. PCT/JP2020/022306 (Aug. 25, 2020).
China National Intellectual Property Administration, Office Action in Chinese Patent Application No. 202080042304.8 (Dec. 5, 2022).

* cited by examiner under an organic polymer material such as natural rubber and

SILANE COUPLING AGENT COMPOSITION COMPRISING SILANE COMPOUND AND PROTEIN MODIFYING AGENT, AND RUBBER COMPOSITION COMPRISING THE SAME

BACKGROUND OF THE INVENTION

Field of the Invention

The present invention relates to a silane coupling agent composition comprising a silane compound and a protein modifying agent, and a rubber composition comprising the same.

Background Art

Conventionally, a silane compound having a reactive functional group and a hydrolyzable group has been used as a constituent of a silane coupling agent in a rubber composition in order to improve dispersibility of an organic polymer material such as rubber and an inorganic material such as silica. In addition, such a silane compound has been used as an adhesion aid in an adhesive composition or a sealing composition in order to improve adhesion to an inorganic material such as glass.

Usually, such a silane compound has a substituent such as a mercapto group, a polysulfide group, an amino group or an epoxy group as a reactive functional group having high reactivity with an organic polymer material such as rubber, and has a substituent such as an alkoxysilyl group as a hydrolyzable group having high reactivity with an inorganic material such as silica or glass. For example, Patent Document 1 discloses a rubber composition containing a polysulfide-based silane coupling agent. Patent document 2 proposes a silane compound having an amino group as a reactive functional group and a methoxy group as a hydrolyzable group.

With respect to the problem that impurities contained in natural rubber inhibit the reaction of a silane coupling agent (Non-Patent Document 1), Patent Document 3 discloses a rubber composition containing specific amounts of silica having a specific surface area and a specific glycerol mono fatty acid ester. In addition, Patent Document 4 discloses a rubber composition for tires using a modified natural rubber obtained by enzymatic treatment with a proteolytic enzyme followed by further enzymatic treatment with a lipolytic enzyme and/or a phospholipidolytic enzyme. In addition, Patent Document 5 discloses a method for producing a deproteinized natural rubber latex characterized in that a protein modifying agent selected from the group consisting of a urea compound and NaClO is added to natural rubber latex, and the protein in the latex is modified and subsequently removed. In addition, Patent Document 6 discloses a method for producing a modified natural rubber in which a urea compound is added to the natural rubber latex to isolate the protein from the rubber particles in the natural rubber latex, and the natural rubber is dried with the isolated protein included.

PRIOR ART DOCUMENTS

Patent Documents

Patent Document 1: Japanese Patent Application Laid-Open Publication No. H8-259736
Patent Document 2: Japanese Patent Application Laid-Open Publication No. H11-335381
Patent Document 3: Japanese Patent Application Laid-Open Publication No. 2016-113515
Patent Document 4: Japanese Patent Application Laid-Open Publication No. 2016-74844
Patent Document 5: Japanese Patent Application Laid-Open Publication No. 2004-99696
Patent Document 6: Japanese Patent Application Laid-Open Publication No. 2010-111722

Non-Patent Document

Non-patent Document 1: Sarkawi S. S. et al., European Polymer Journal vol. 49 p. 3199 (2013)

SUMMARY OF THE INVENTION

Problem to be Solved by the Invention

However, the reactive functional groups contained in the silane compounds proposed in Patent Documents 1 and 2 have a high polarity, and when the organic polymer material to be mixed has a low polarity, poor dispersion or poor mixing tendency to occur because the affinity between the silane compound and the organic polymer material is low. Therefore, when such a silane compound is contained in a rubber composition, it was likely that the hardness, tensile properties and viscoelasticity cannot be sufficiently improved of a molded article of a rubber composition such as a tire obtained by molding the rubber composition or the like. In addition, when such a silane compound is added to an adhesive or a sealant, there was a tendency that the affinity between the silane compound and an organic polymer material having a low polarity decreases and the adhesion to an inorganic material decreases. On the other hand, when a conventional silane compound having a reactive functional group having a low polarity is added in order to increase the affinity with an organic polymer material having a low polarity, the performance as a silane coupling agent or an adhesion aid is insufficient because the reactivity with the organic polymer material is low.

Further, the rubber composition described in Patent Document 3, in which silica having a specific surface area and a specific glycerol monofatty acid ester are blended in a specific amount, had room for further improvement in tensile properties such as modulus. In addition, the rubber composition for tires using the modified natural rubber obtained by enzymatic treatment with a proteolytic enzyme and then enzymatic treatment with a lipolytic enzyme and/or a phospholipidolytic enzyme, described in Patent Document 4, had a concern that the process becomes complicated and that it causes an increase in cost.

Further, although Patent Document 5 uses a protein modifying agent, it is a technique related to the production of liquid natural rubber latex, and there is no mention of dry rubber-like natural rubber. In addition, there is no description of a specific silane coupling agent. Patent Document 6 relates to the production of a solid natural rubber using a special apparatus after adding a protein modifying agent to natural rubber latex, but it does not describe a specific silane coupling agent.

The present inventors have intensively studied means for solving the problem that impurities (proteins, phospholipids and the like) in natural rubber inhibit the coupling reaction which causes poor mixing and poor dispersion between organic polymer materials including natural rubber and inorganic materials such as silica, and as a result, have found that by blending a silane compound having a specific structure and having a function as a coupling agent itself and a protein modifying agent in a rubber composition and the like, the coupling reaction accelerates, whereby dispersibility of the inorganic materials such as silica is improved, and the viscoelastic properties of rubber products and the like obtained from the rubber composition and the like are improved. The present invention is based on this finding.

Accordingly, it is an object of the present invention to provide a rubber composition which suppresses poor mixing or poor dispersion from occurring between an organic polymer material derived from natural rubber and an inorganic material such as silica and exhibits excellent viscoelastic properties, and a silane coupling agent composition used in the same.

Means for Solving the Problem

The present invention includes the following inventions.

[1] A silane coupling agent composition comprising a silane compound represented by Formula (1):

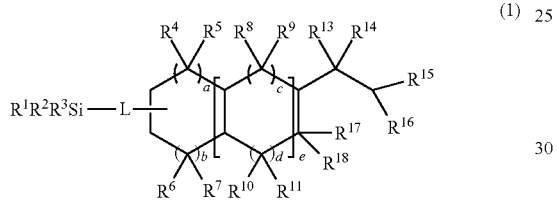

(1)

wherein $R^1$, $R^2$, and $R^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or
$R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons; and
a protein modifying agent.

[2] The silane coupling agent composition according to [1], wherein the silane compound is a compound represented by Formula (2):

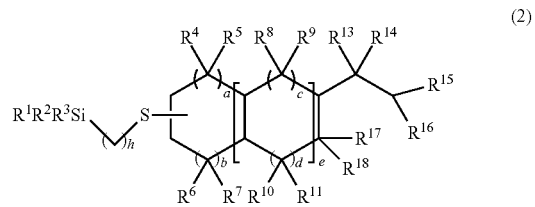

(2)

wherein $R^1$, $R^2$, and $R^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or
$R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons.

[3] The silane coupling agent composition according to [1] or [2], wherein the silane compound is a compound represented by Formula (3):

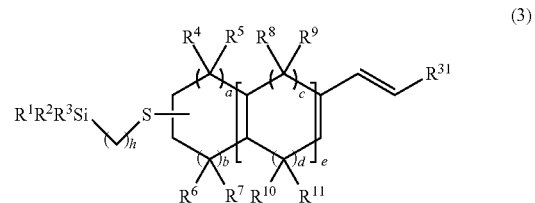

(3)

wherein $R^1$, $R^2$, and $R^3$ each independently represents a hydrocarbon group optionally containing an oxygen atom or a nitrogen atom, or a hydrogen atom;

h is an integer of 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;

$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and $R^{31}$ is a hydrogen atom, a methyl group, or an alkyl group having 2 to 8 carbon atoms.

[4] The silane coupling agent composition according to [1] or [2], wherein the silane compound is a compound represented by Formula (4):

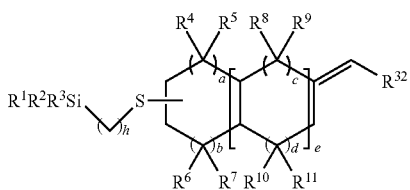

(4)

wherein $R^1$, $R^2$, and $R^3$ each independently represents a hydrocarbon group optionally containing an oxygen atom or a nitrogen atom, or a hydrogen atom;

h is an integer of 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;

$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and $R^{32}$ is a hydrogen atom, a methyl group, or an alkyl group having 2 to 9 carbon atoms.

[5] The silane coupling agent composition according to [1] or [2], wherein the silane compound is a compound represented by Formula (5):

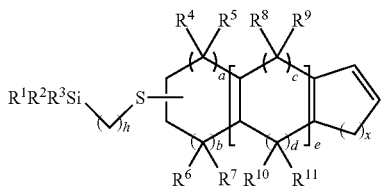

(5)

wherein $R^1$, $R^2$, and $R^3$ each independently represents a hydrocarbon group optionally containing an oxygen atom or a nitrogen atom, or a hydrogen atom;

h is an integer of 1 to 10;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;

$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5 and x is an integer from 0 to 5.

[6] The silane coupling agent composition according to [1] or [2], wherein the silane compound is a compound represented by Formula (6):

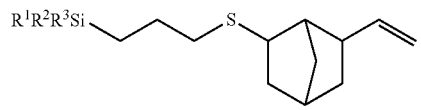

(6)

wherein $R^1$, $R^2$, and $R^3$ each independently represents a hydrocarbon group optionally containing an oxygen atom or a nitrogen atom, or a hydrogen atom; or Formula (7):

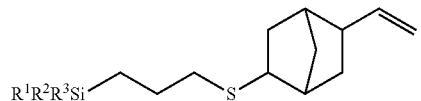

(7)

wherein $R^1$, $R^2$, and $R^3$ each independently represents a hydrocarbon group optionally containing an oxygen atom or a nitrogen atom, or a hydrogen atom; or

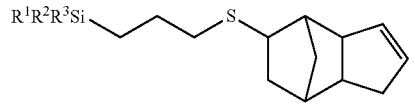

(8)

wherein $R^1$, $R^2$, and $R^3$ each independently represents a hydrocarbon group optionally containing an oxygen atom or a nitrogen atom, or a hydrogen atom; or Formula (9):

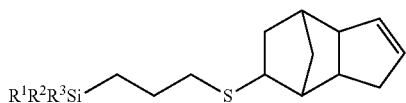

(9)

wherein $R^1$, $R^2$, and $R^3$ each independently represents a hydrocarbon group optionally containing an oxygen atom or a nitrogen atom, or a hydrogen atom.

[7] The silane coupling agent composition according to any one of [1] to [6], wherein the $R^1R^2R^3Si$ group of the silane compound has a chemical structure represented by Formula (10):

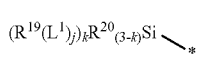

(10)

wherein $R^{19}$ each independently represents an alkoxy group or an amino group substituted with one or more alkyl groups;

$R^{20}$ each independently represents a hydrogen atom or an alkyl group;

$L^1$ each independently represents a hydrocarbon group optionally including at least one hetero atom selected from the group consisting of nitrogen, oxygen, and sulfur;

j is each independently an integer of 0 or 1;

k is an integer of 1 to 3; and an asterisk (*) indicates a region bonded to a moiety other than a silyl group of the sulfur-containing silane compound.

[8] The silane coupling agent composition according to any one of [1] to [7], wherein the $R^1R^2R^3Si$ group of the silane compound is a triethoxysilyl group.

[9] The silane coupling agent composition according to any one of [1] to [8], wherein the protein modifying agent is at least one selected from the group consisting of a carbamide compound, a guanidine compound, and a surfactant.

[10] The silane coupling agent composition according to [9], wherein the silane coupling agent composition contains a carbamide compound and a guanidine compound, and the ratio of the content of the guanidine compound to the content of the carbamide compound is 0.01 to 3.

[11] The silane coupling agent composition according to [9] or [10], wherein the carbamide compound is urea.

[12] The silane coupling agent composition according to any one of [9] to [11], wherein the guanidine compound is at least one selected from the group consisting of a guanidine hydrochloride and a diphenylguanidine.

[13] The silane coupling agent composition according to [9], wherein the surfactant is sodium dodecyl sulfate.

[14] The silane coupling agent composition according to any one of [1] to [13], further comprising carbon black.

[15] The silane coupling agent composition according to any one of [1] to [14], further comprising a silane compound other than the compound represented by formula (1).

[16] The silane coupling agent composition according to [15], wherein the silane compound other than the compound represented by Formula (1) is a silane compound represented by Formula (11):

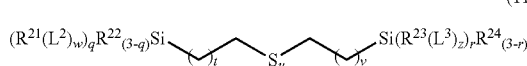

(11)

wherein t and v are each independently an integer from 0 to 10;

u is an integer from 2 to 10;

q and r are each independently an integer from 1 to 3;

w and z are each independently an integer of 0 or 1;

$L^2$ and $L^3$ are each independently a hydrocarbon group optionally containing at least one hetero atom selected from the group consisting of nitrogen, oxygen, and sulfur;

$R^{21}$ and $R^{23}$ are each independently an alkoxy group or an amino group substituted with one or more alkyl groups; and $R^{22}$ and $R^{24}$ are each independently hydrogen atom or an alkyl group.

[17] The silane coupling agent composition according to [15] or [16], wherein the proportion of the content of the silane compound other than the compound represented by Formula (1) in the silane coupling agent composition with respect to the total content of the silane compound in the silane coupling agent composition is 0.1 to 0.9 on a mass basis.

[18] The silane coupling agent composition according to any one of [1] to [16], used for natural rubber or deproteinized natural rubber.

[19] A rubber composition comprising the silane coupling agent composition according to any one of [1] to [17], at least one elastomer having a glass transition point of 25° C. or less selected from the group consisting of natural rubber and deproteinized natural rubber, and an inorganic material.

[20] The rubber composition according to [19], wherein the total content of the silane compound in the rubber composition is 0.1 to 30 parts by mass with respect to 100 parts by mass of the elastomer.

[21] The rubber composition according to [19] or [20], wherein the content of the protein modifying agent in the rubber composition is 0.01 to 10 parts by mass with respect to 100 parts by mass of the elastomer.

[22] A method for producing the rubber composition according to any one of [19] to [21], comprising the step of kneading the silane compound, the protein modifying agent, the elastomer, and the inorganic material.

[23] The method according to [22], further comprising the step of prekneading the protein modifying agent and the elastomer prior to the step of kneading the silane compound, the protein modifying agent, the elastomer, and the inorganic material.

[24] The method according to [22] or [23], further comprising the step of kneading a vulcanizing agent.

[25] A cross-linked product of the rubber composition according to any one of [19] to [21].

[26] A method for producing a cross-linked product comprising the step of extruding the rubber composition according to any one of [19] to [21], the step of molding the extruded composition, and the step of cross-linking the molded composition.

[27] A tire comprising the cross-linked product according to [25].

Effect of the Invention

The present invention is advantageous in respect that it provides a composition useful as a silane coupling agent containing a silane compound and a protein modifying agent, which does not inhibit the coupling reaction even in the presence of impurities contained in natural rubber or the like and, as a result, suppresses poor mixing or poor dispersion with an inorganic material such as silica. Furthermore, the present invention is advantageous in respect that by using the silane compound and the protein modifying agent in the composition of the present invention, it is possible to improve the viscoelastic properties of a cross-linked product obtained from a composition containing impurities contained in natural rubber or the like. Furthermore, the present invention is advantageous in that the unvulcanized viscosity of the rubber composition can be reduced. Furthermore, it is advantageous in that the tensile property (100% modulus) of the cross-linked product obtained from the rubber composition of the present invention can be improved. The present invention is also advantageous in that the low fuel consumption performance of the cross-linked product obtained from the rubber composition can be improved. Furthermore, the present invention is advantageous in that the problem can be solved by changing to a simpler process compared with the prior art.

MODE FOR CARRYING OUT THE INVENTION

1. Definitions

Figure 1:
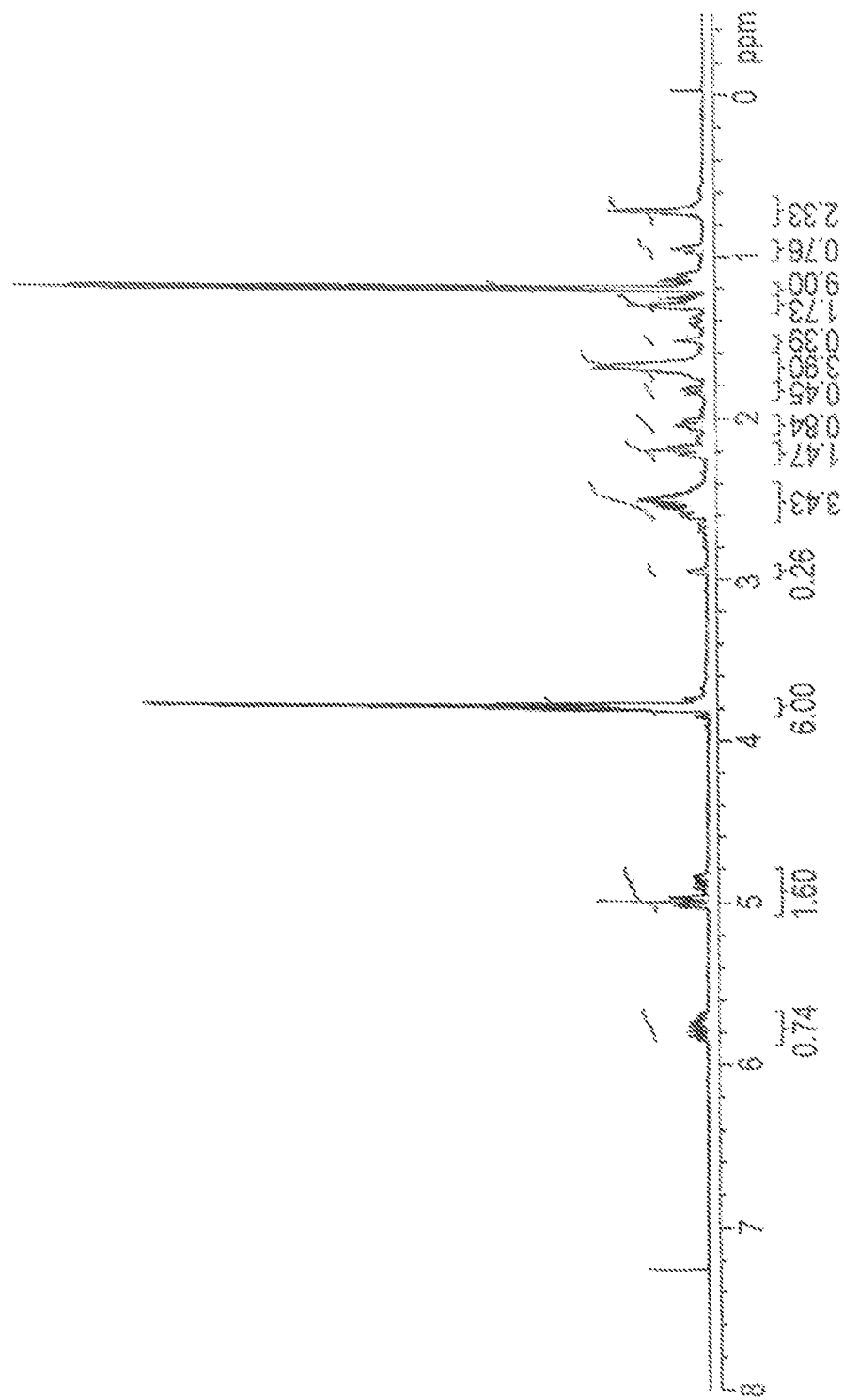
FIG. 1 shows a $^1$H-NMR chart of silane compound 1 synthesized in Preparation Example 1.

In the present specification, "part", "%" and the like indicating the composition are based on mass unless otherwise specified.

2. Silane Coupling Agent Composition and Rubber Composition

The silane coupling agent composition of the present invention is characterized by containing a silane compound represented by formula (1) and a protein modifying agent. The silane coupling agent composition may further contain carbon black. As the carbon black, it is possible to use carbon black described in the inorganic material described below.

The rubber composition is characterized by containing a silane compound represented by Formula (1) below, a protein modifying agent, an elastomer having a glass transition point of 25° C. or lower, and an inorganic material.

(1) Silane Compound
(i) Chemical Structure of Silane Compound

The silane compound contained in the silane coupling agent composition and the rubber composition of the present invention is a compound represented by the following Formula (1):

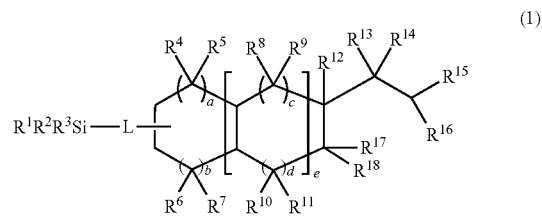

wherein $R^1$, $R^2$, and $R^3$ each independently represents a hydrocarbon group optionally containing an oxygen atom or a nitrogen atom, or a hydrogen atom;

L represents a hydrocarbon group optionally containing at least one hetero atom selected from the group consisting of nitrogen, oxygen, and sulfur;

a is an integer of 0 or 1;

b is an integer of 0 or 1;

c is each independently an integer of 0 or 1;

d is each independently an integer of 0 or 1;

e is an integer from 0 to 5;

$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;

$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;

$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons.

In the above Formula (1), a is an integer of 0 or 1, preferably 1.

b is an integer of 0 or 1, preferably 1.

c is each independently an integer of 0 or 1, preferably 1.

d is each independently an integer of 0 or 1, preferably 1.

e is an integer of 0 to 5, preferably 0 to 3, more preferably 0 to 2, and further preferably 0 or 1.

$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—.

Further, f is an integer of 1 to 5, preferably 1 to 4, more preferably 1 to 3, and further preferably 1.

$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—.

Further, g is an integer of 1 to 5, preferably 1 to 4, more preferably 1 to 3, and more preferably 1.

In addition, $R^{16}$ is a hydrogen atom, a methyl group or an alkyl group having 2 to 8 carbon atoms, preferably a hydrogen atom, a methyl group or an alkyl group having 2 or 3 carbon atoms, more preferably a hydrogen atom or a methyl group, and further preferably a hydrogen atom, and $R^{17}$ is a hydrogen atom, a methyl group or an alkyl group having 2 to 10 carbon atoms, preferably a hydrogen atom, a methyl group or an alkyl group having 2 to 5 carbon atoms, more preferably a hydrogen atom or a methyl group, and further preferably a hydrogen atom, wherein $R^{12}$ and $R^{13}$ are bonded to each other to form a double bond, and $R^{14}$, $R^{15}$ and $R^{18}$ are a hydrogen atom, a methyl group or an alkyl group having 2 to 10 carbon atoms, or $R^{14}$ and $R^{15}$ are bonded to each other to form a double bond, and $R^{12}$, $R^{13}$ and $R^{18}$ are a hydrogen atom, a methyl group or an alkyl group having 2 to 10 carbon atoms, or $R^{16}$ and $R^{17}$ may be bonded to each other to form a 4 to 9-membered alicyclic hydrocarbon, preferably a 4 to 7-membered alicyclic hydrocarbon, more preferably a 5 or 6-membered alicyclic hydrocarbon, and further preferably a 5-membered alicyclic hydrocarbon, wherein $R^{14}$ and $R^{15}$ are bonded to each other to form a double bond, and $R^{12}$, $R^{13}$ and $R^{18}$ are a hydrogen atom, a methyl group or an alkyl group having 2 to 10 carbon atoms.

In Formula (1) above, $R^1$, $R^2$ and $R^3$ each independently represent a hydrocarbon group which may contain an oxygen atom or a nitrogen atom, or a hydrogen atom. Examples of the hydrocarbon group include an alkyl group, an aralkyl group, an aryl group, and the like.

Examples of the alkyl group include a methyl group, ethyl group, propyl group, butyl group, isopropyl group, tert-butyl group, 2-ethylhexyl group, cyclopentyl group, and cyclohexyl group, and the number of carbons in the alkyl group is preferably 1 to 60, more preferably 1 to 30, and a methyl group or an ethyl group is particularly preferred.

Examples of the aralkyl group include a benzyl group, phenethyl group, naphthylmethyl group, and biphenylmethyl group. The number of carbons in the aralkyl group is preferably from 7 to 60, more preferably from 7 to 20, and further preferably from 7 to 14.

Examples of the aryl group include a phenyl group, biphenyl group, naphthyl group, tolyl group, xylyl group, and the like. The number of carbons in the aryl group is preferably from 6 to 60, more preferably from 6 to 24, and further preferably from 6 to 12.

The hydrocarbon group containing an oxygen atom or a nitrogen atom is a group having a structure in which a carbon atom in the hydrocarbon group is replaced with an oxygen atom or a nitrogen atom.

In a further preferred embodiment of the invention, the hydrocarbon group optionally containing an oxygen atom or a nitrogen atom in $R^1$, $R^2$ and $R^3$ is an alkoxy group, an amino group substituted with one or more alkyl groups, or an alkyl group. More preferably, an alkoxy group having 1 to 30 carbons, further preferably an alkoxy group having 1 to 20 carbons, more preferably an amino group substituted with one or more alkyl groups having 1 to 30 carbons, further preferably an amino group substituted with one or more alkyl groups having 1 to 20 carbons, or more preferably an alkyl group having 1 to 30 carbons, further preferably an alkyl group having 1 to 20 carbons. Examples of the alkoxy group include a methoxy group, ethoxy group, propoxy group, isopropoxy group, butoxy group and isobutoxy group, and a methoxy group or an ethoxy group is particularly preferable. Examples of the amino group substituted with one or more alkyl groups include an N-methylamino group, N,N-dimethylamino group, N-ethylamino group, N,N-diethylamino group, and N-isopropylamino group, and an N-methylamino group or an N-ethylamino group is particularly preferable. Examples of the alkyl group include a methyl group, ethyl group, propyl group, isopropyl group, butyl group, isobutyl group, tert-butyl group, pentyl group, cyclopentyl group, hexyl group, and a cyclohexyl group, among which a methyl group and an ethyl group are preferable.

In Formula (1) above, L is a hydrocarbon group which may contain at least one hetero atom selected from the group consisting of nitrogen, oxygen and sulfur, and preferably a hydrocarbon group having 1 to 30 carbons which may contain at least one hetero atom selected from the group consisting of nitrogen, oxygen and sulfur, more preferably a hydrocarbon group having 1 to 20 carbons which may contain at least one hetero atom selected from the group consisting of nitrogen, oxygen and sulfur, and further preferably a hydrocarbon group having 1 to 10 carbon atoms which may contain at least one hetero atom selected from the group consisting of nitrogen, oxygen and sulfur. Among them, L is particularly preferably a hydrocarbon group containing sulfur. The length of the straight chain portion connecting the silyl group and the alicyclic hydrocarbon portion in such hydrocarbon group is preferably from 3 to 8, more preferably from 4 to 7, and even more preferably from 4 to 6 as a total sum of number of atoms of carbon, nitrogen, oxygen, or sulfur.

The silane compound in the silane coupling agent composition and the rubber composition of the present invention is preferably a sulfur-containing silane compound.

The compound represented by Formula (1) contained in the silane coupling agent composition and the rubber composition of the present invention is preferably a compound represented by Formula (2):

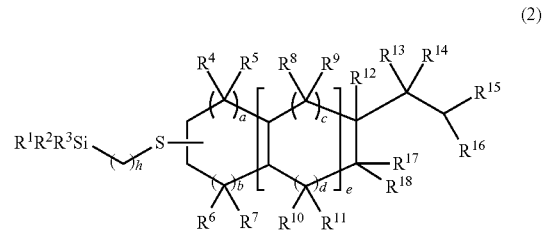

(2)

wherein $R^1$, $R^2$, and $R^3$ each independently represents a hydrocarbon group optionally containing an oxygen atom or a nitrogen atom, or a hydrogen atom;

h is an integer of 1 to 10;

a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or
$R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons.

In the compound represented by Formula (2) above, h is an integer of 1 to 10, preferably 1 to 8, more preferably 2 to 7, further preferably 3 to 6, further more preferably 3 to 5, and particularly preferably 3. Further, a to g and $R^1$ to $R^{18}$ are as described in Formula (1) above.

The compound represented by Formula (1) contained in the silane coupling agent composition and the rubber composition of the present invention is more preferably a compound represented by Formula (3):

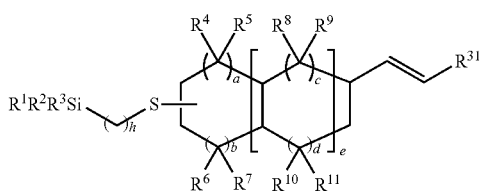

(3)

wherein $R^1$, $R^2$, and $R^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and
$R^{31}$ is a hydrogen atom, a methyl group, or an alkyl group having 2 to 8 carbon atoms.

Among the compounds represented by formula (3), a to g and $R^1$ to $R^{11}$ are as described in Formula (1) above, and h is as described in Formula (2) above.

In formula (3), $R^{31}$ represents a hydrogen atom, a methyl group or an alkyl group having 2 to 8 carbon atoms, preferably a hydrogen atom, a methyl group or an alkyl group having 2 to 5 carbon atoms, more preferably a hydrogen atom, a methyl group or an alkyl group having 1 or 2 carbon atoms, and further preferably a hydrogen atom.

The compound represented by Formula (1) contained in the silane coupling agent composition and the rubber composition of the present invention is more preferably a compound represented by Formula (4):

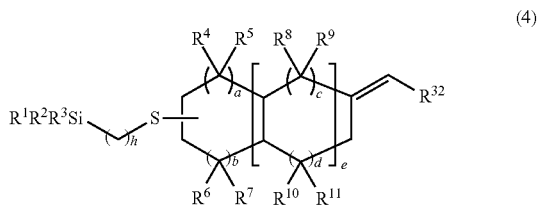

(4)

wherein $R^1$, $R^2$, and $R^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and
$R^{32}$ is a hydrogen atom, a methyl group, or an alkyl group having 2 to 9 carbon atoms.

Among the compounds represented by Formula (4) above, a to g and $R^1$ to $R^{11}$ are as described in Formula (1) above, and h is as described in Formula (2) above.

In formula (4), $R^{32}$ is a hydrogen atom, a methyl group, or an alkyl group having 2 to 9 carbon atoms, preferably a methyl group or an alkyl group having 2 to 5 carbon atoms, more preferably a methyl group or an alkyl group having 1 or 2 carbon atoms, and even more preferably a methyl group.

The compound represented by Formula (1) contained in the silane coupling agent composition and the rubber composition of the present invention is more preferably a compound represented by Formula (5):

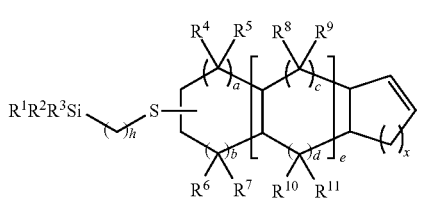
(5)

wherein $R^1$, $R^2$, and $R^3$ each independently represents a hydrocarbon group optionally containing an oxygen atom or a nitrogen atom, or a hydrogen atom;

h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5 and x is an integer from 0 to 5.

Among the compounds represented by Formula (5) above, a to g and $R^1$ to $R^{11}$ are as described in Formula (1) above, and h is as described in Formula (2) above.

In Formula (5), x is an integer of 0 to 5, preferably an integer of 0 to 3, more preferably 1 or 2, and further preferably 1.

The compound represented by Formula (1) contained in the silane coupling agent composition and the rubber composition of the present invention is further preferably a compound represented by formula (6):

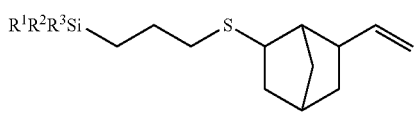
(6)

wherein $R^1$, $R^2$, and $R^3$ each independently represents a hydrocarbon group optionally containing an oxygen atom or a nitrogen atom, or a hydrogen atom; or Formula (7):

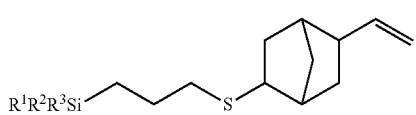
(7)

wherein $R^1$, $R^2$, and $R^3$ each independently represents a hydrocarbon group optionally containing an oxygen atom or a nitrogen atom, or a hydrogen atom; or Formula (8):

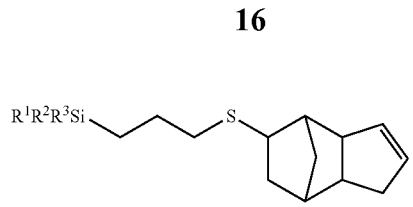
(8)

wherein $R^1$, $R^2$, and $R^3$ each independently represents a hydrocarbon group optionally containing an oxygen atom or a nitrogen atom, or a hydrogen atom; or Formula (9):

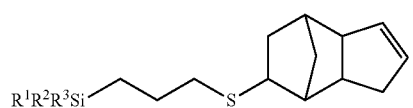
(9)

wherein $R^1$, $R^2$, and $R^3$ each independently represents a hydrocarbon group optionally containing an oxygen atom or a nitrogen atom, or a hydrogen atom.

In the compounds represented by Formulae (6) to (9) above, $R^1$ to $R^3$ are as described in Formula (1) above.

As another further preferable embodiment of the compound represented by Formula (1) in the silane coupling agent composition and the rubber composition of the present invention, mention can be made to compounds represented by Formulae (12) to (25):

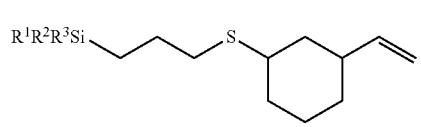
(12)

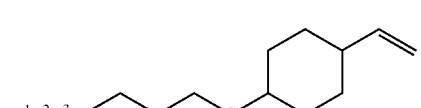
(13)

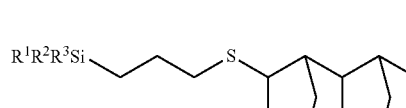
(14)

(15)

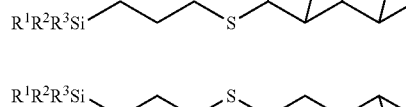
(16)

(17)

-continued

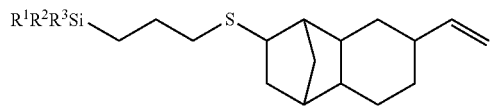
(18)

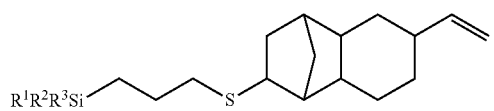
(19)

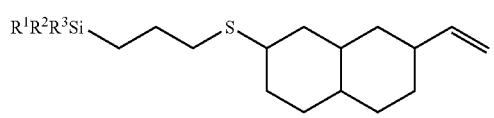
(20)

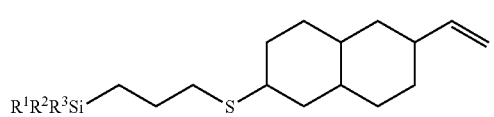
(21)

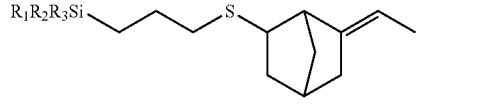
(22)

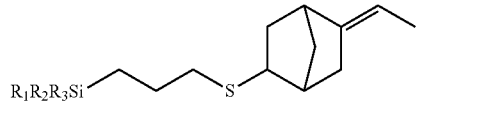
(23)

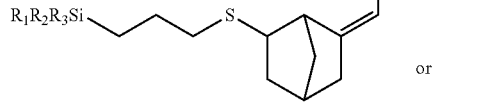
(24)

or

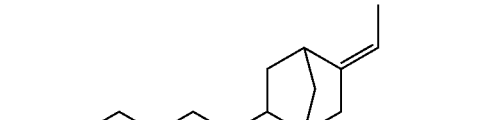
(25)

wherein $R^1$, $R^2$, and $R^3$ each independently represents a hydrocarbon group optionally containing an oxygen atom or a nitrogen atom, or a hydrogen atom.

In the compounds represented by Formulae (12) to (25) above, $R^1$ to $R^3$ are as described in Formula (1) above.

An example of a further more preferable embodiment of the compound represented by formula (1) contained in the silane coupling agent composition and the rubber composition of the present invention is a silane compound wherein the $R^1R^2R^3Si$ group has the chemical structure according to Formula (10):

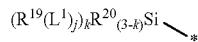
(10)

wherein $R^{19}$ each independently represents an alkoxy group or an amino group substituted with one or more alkyl groups;
$R^{20}$ each independently represents a hydrogen atom or an alkyl group;
$L^1$ each independently represents a hydrocarbon group optionally including at least one hetero atom selected from the group consisting of nitrogen, oxygen, and sulfur;
j is independently an integer of 0 or 1;
k is an integer of 1 to 3; and
an asterisk (*) indicates a region bonded to a moiety other than a silyl group of the sulfur-containing silane compound
in Formulae (1) to (9) and Formulae (12) to (25) above.

In Formula (10) above, $R^{19}$ is each independently an alkoxy group or an amino group substituted with one or more alkyl groups. In one preferred embodiment, $R^{19}$ is each independently a hydrolyzable group, and is an alkoxy group, more preferably an alkoxy group having 1 to 30 carbons, further preferably an alkoxy group having 1 to 20 carbons, or an amino group substituted with one or more alkyl groups, more preferably an amino group substituted with one or more alkyl groups having 1 to 30 carbons, further preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, which among a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, which among an N-methylamino group or an N-ethylamino group is preferable. Note that, the alkoxy group and the amino group may be bonded with silicon (Si) via a connecting group comprising a hydrocarbon group optionally containing at least one hetero atom selected from the group consisting of nitrogen, oxygen, and sulfur.

$R^{20}$ each independently represents a hydrogen atom or an alkyl group, more preferably an alkyl group having 1 to 30 carbons, and further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group and cyclohexyl group, among which a methyl group and an ethyl group are preferable.

In the above Formula (10), $L^1$ is each independently a hydrocarbon group optionally containing at least one hetero atom selected from the group consisting of nitrogen, oxygen and sulfur, preferably a hydrocarbon group having 1 to 30 carbons optionally containing at least one hetero atom selected from the group consisting of nitrogen, oxygen and sulfur, more preferably a hydrocarbon group having 1 to 20 carbons optionally containing at least one hetero atom selected from the group consisting of nitrogen, oxygen and sulfur, and further preferably a hydrocarbon group having 1 to 10 carbons which may contain at least one hetero atom selected from the group consisting of nitrogen, oxygen and sulfur.

In the above Formula (10), k is an integer of 1 to 3, preferably an integer of 2 to 3, and more preferably 3.

j is independently an integer of 0 or 1, preferably 0.

As the compound represented by Formula (1) contained in the silane coupling agent composition and the rubber composition of the present invention, a silane compound in which the $R^1R^2R^3Si$ group is a triethoxysilyl group or a trimethoxysilyl group is even preferable, and a silane compound in which the $R^1R^2R^3Si$ group is a triethoxysilyl group is even more preferable in Formulae (1) to (9) and Formulae (12) to (25) above.

Particularly preferred embodiments of the compound represented by Formula (1) contained in the silane coupling agent composition and the rubber composition of the present invention include compounds represented by Formulae (26) to (43):

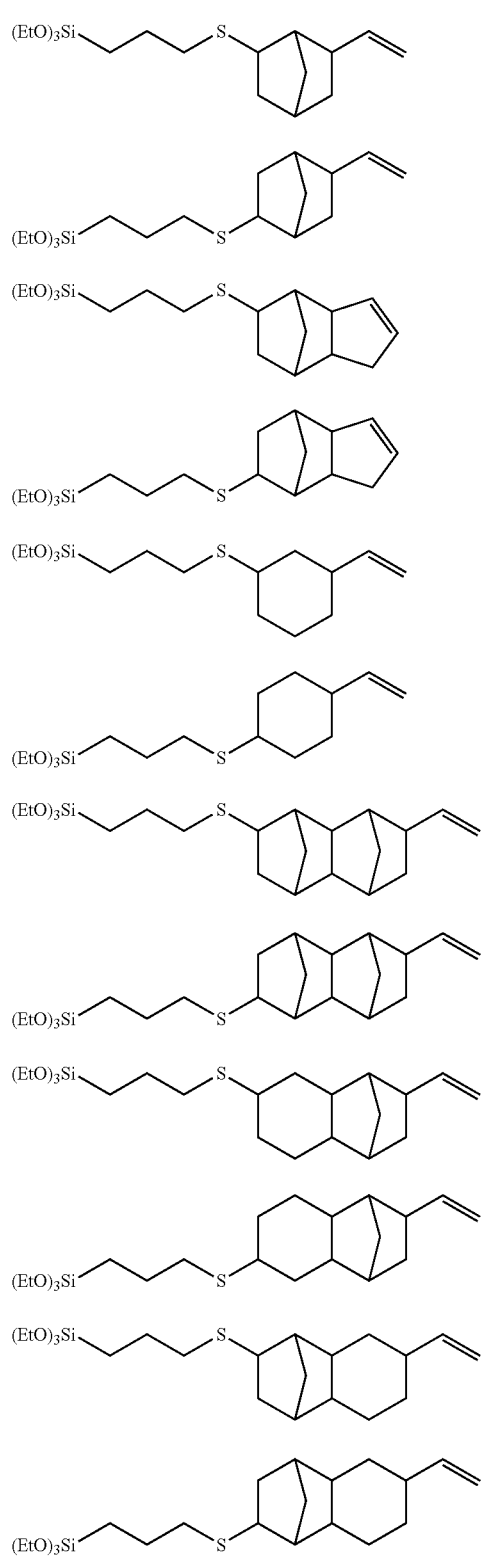

(26) (27) (28) (29) (30) (31) (32) (33) (34) (35) (36) (37)

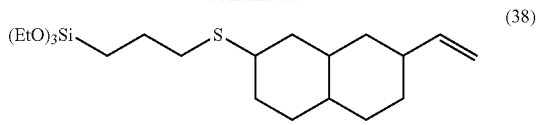

(38)

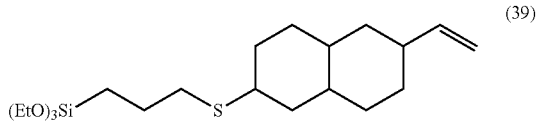

(39)

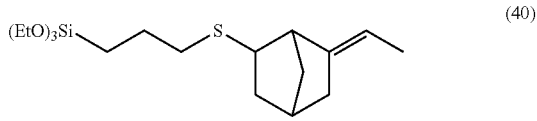

(40)

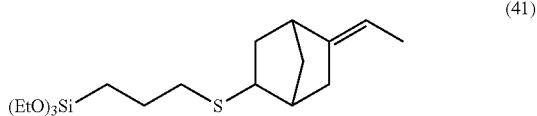

(41)

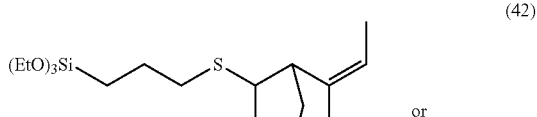

(42)

or

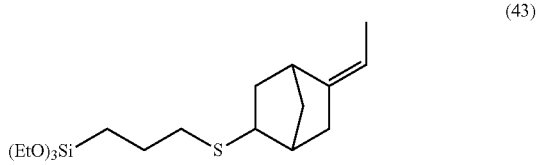

(43)

The compound represented by Formula (1) above of the present invention is preferably a stereoisomer thereof or any mixture of those stereoisomers.

(ii) Method for Producing Silane Compound Represented by Formula (1)

The compound represented by Formula (1) contained in the silane coupling agent composition and the rubber composition of the present invention can be produced by reacting a compound represented by Formula (44):

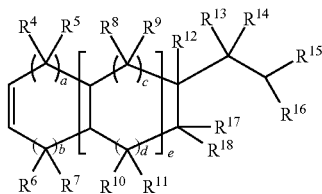

(44)

wherein
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;

$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons, and a compound represented by Formula (45):

 (45)

wherein $R^1$, $R^2$, and $R^3$ each independently represents a hydrocarbon group optionally containing an oxygen atom or a nitrogen atom, or a hydrogen atom; and Y is a hydrocarbon group optionally containing at least one hetero atom selected from the group consisting of nitrogen, oxygen and sulfur.

In Formula (44) and Formula (45) above, $R^1$ to $R^{18}$ and a to g are as described in the compound represented by Formula (1).

In Formula (45) above, Y is a hydrocarbon group which may contain at least one hetero atom selected from the group consisting of nitrogen, oxygen, and sulfur, preferably a hydrocarbon group optionally containing at least one hetero atom selected from the group consisting of nitrogen, oxygen, and sulfur of 1 to 30 carbons, more preferably a hydrocarbon group optionally containing at least one hetero atom selected from the group consisting of nitrogen, oxygen and sulfur of 1 to 20 carbons, and further preferably a hydrocarbon group optionally containing at least one hetero atom selected from the group consisting of nitrogen, oxygen and sulfur of 1 to 10 carbons. Among them, Y is particularly preferably a hydrocarbon group containing sulfur. The length of the linear chain portion connecting the portions bonding to the silyl group in the hydrocarbon group and the alicyclic hydrocarbon moiety in the total number of carbon, nitrogen, oxygen, or sulfur atoms is preferably 3 to 8, more preferably 4 to 7, and further preferably 4 to 6.

It is possible to synthesize by subjecting the compound represented by Formula (44) and the compound represented by Formula (45) to an addition reaction or a condensation reaction in manufacturing the compound represented by Formula (1) as above. As the addition reaction herein, it is possible to utilize a radical addition reaction, conjugate addition reaction, nucleophilic addition reaction, electrophilic addition reaction, or the like, and for example, it is possible to utilize a reaction similar to a pericyclic reaction, or hydrosilylation reaction, hydroamination reaction, or the like. As the condensation reaction, for example, it is possible to utilize an esterification reaction, amidation reaction, thioesterification reaction, thioamidation reaction, Friedel-Crafts reaction, or the like.

The compound represented by the above-described formula (44) can be synthesized by a Diels-Alder reaction between the same or different conjugated diene compounds or a Diels-Alder reaction between a conjugated diene compound and an alkene compound based on the knowledge already known to those skilled in the art. The compound represented by formula (44) can be prepared by heat-denaturing, as required, and/or by purifying, as required, the compound synthesized by the Diels-Alder reaction.

The compound represented by Formula (2) above can be produced by reacting a compound represented by Formula (44):

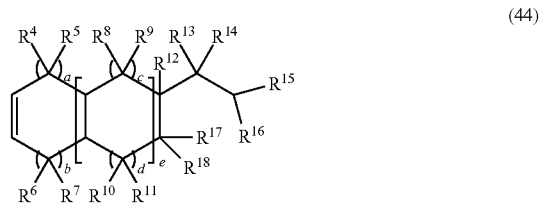 (44)

wherein
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5;
$R^{16}$ is a hydrogen atom, a methyl group or an alkyl group having 2 to 8 carbons, and $R^{17}$ is a hydrogen atom, a methyl group or an alkyl group having 2 to 10 carbons, where $R^{12}$ and $R^{13}$ bond to each other to form a double bond, and $R^{14}$, $R^{15}$, and $R^{18}$ are a hydrogen atom, a methyl group or an alkyl group having 2 to 10 carbons or $R^{14}$ and $R^{15}$ bond to each other to form a double bond, and $R^{12}$, $R^{13}$, and $R^{18}$ are a hydrogen atom, a methyl group or an alkyl group having 2 to 10 carbons; or $R^{16}$ and $R^{17}$ may bond to each other to form a 4 to 9 membered alicyclic hydrocarbon, where $R^{14}$ and $R^{15}$ bond to each other to form a double bond, and $R^{12}$, $R^{13}$, and $R^{18}$ are a hydrogen atom, a methyl group or an alkyl group having 2 to 10 carbons, and a compound represented by Formula (46):

 (46)

wherein $R^1$, $R^2$, and $R^3$ each independently represents a hydrocarbon group optionally containing an oxygen atom or a nitrogen atom, or a hydrogen atom; and h is an integer from 1 to 10.

In Formula (44) and Formula (46) above, $R^1$ to $R^{18}$ and a to g are as described in the compound represented by Formula (1). In addition, h is as described in the compound represented by Formula (2).

It is considered that the compound represented by Formula (2) above is synthesized by reacting a mercapto group in the compound represented by Formula (46) above with a carbon-carbon unsaturated bond moiety in the compound represented by Formula (44) above by mixing the compound represented by Formula (44) above with the compound represented by Formula (46) above and heating the mixture. The compound represented by Formula (46) above is preferably mixed in an amount of 0.1 to 4 mol, more preferably 0.3 to 3 mol, per 1 mol of the compound represented by Formula (44) above. The heating temperature is preferably 40 to 300° C., and more preferably 50 to 200° C.

Examples of the compound represented by Formula (46) above include an alkoxysilane compound having a mercapto group. Examples of the alkoxysilane compound having a mercapto group include mercaptotrimethoxysilane, mercaptotriethoxysilane, mercaptomethyltrimethoxysilane, mercaptomethyltriethoxysilane, mercaptomethyltripropoxysilane, 2-mercaptoethyltrimethoxysilane, 2-mercaptoethyltriethoxysilane, 3-mercaptopropyltrimethoxysilane, 4-mercaptobutyltrimethoxysilane, 3-mercaptopropyltriethoxysilane, 4-mercaptobutyltriethoxysilane, 2-mercaptoethyltripropoxysilane, 3-mercaptopropyltripropoxysilane, 4-mercaptobutyltripropoxysilane, 2-mercaptoethylmethyldimethoxysilane, 3-mercaptopropylmethyldimethoxysilane, 4-mercaptobutylmethyldimethoxysilane, 2-mercaptoethylmethyldiethoxysilane, 3-mercaptopropylmethyldiethoxysilane, 4-mercaptobutylmethyldiethoxysilane, and the like.

The compound represented by Formula (2) above can also be synthesized by mixing the compound represented by Formula (44) above with the compound represented by Formula (11) to be described below and heating the mixture. It is considered that a polysulfide bond in the compound represented by Formula (11) to be described below causes cleavage and this reacts with the carbon-carbon unsaturated bond moiety in the compound represented by Formula (44) above, thereby synthesizing the compound represented by Formula (2) above. The compound represented by Formula (11) to be described below is preferably mixed in an amount of 0.1 to 4 mol, more preferably 0.3 to 3 mol per 1 mol of the compound represented by Formula (44) above. The heating temperature is preferably 40 to 300° C., and more preferably 50 to 200° C.

If necessary, a radical initiator may be used in combination. Examples of the radical initiator include azo compounds such as azobisisobutyronitrile (AIBN) and 1,1'-azobis(cyclohexanecarbonitrile) (ABCN); peroxides such as di-tert-butyl peroxide (t-BuOOBu-t) and tert-butyl hydroperoxide (t-BuOOH), benzoyl peroxide (BPO, PhC(=O)OOC (=O)pH), methyl ethyl ketone peroxide, and dicumyl peroxide (DCP); dihalogen compounds such as chlorine molecules, and redox initiators of a combination of an oxidizing agent and a reducing agent such as hydrogen peroxide and iron(II)salt, persulfate and sodium hydrogen sulfite; triethylborane ($Et_3B$); and diethylzinc ($Et_2Zn$).

Among the compounds represented by formula (7) to be described later, bis[3-(triethoxysilyl)propyl]tetrasulfide may be one commercially available, for example, Si-69 manufactured by Evonik Corporation. Bis[3-(triethoxysilyl)propyl]disulfide may also be one commercially available, for example, Si-75 manufactured by Evonik Corporation.

(2) Protein Modifying Agent

As the protein modifying agent contained in the silane coupling agent composition and the rubber composition of the present invention, protein modifying agents known to those skilled in the art can be used. The protein modifying agent may be of any kind which can reduce the stability of the high-order structure of the protein in the natural rubber. Typical protein modifying agents include carbamide compounds such as urea derivatives and thioureas; guanidine compounds such as guanidine hydrochloride, guanidinium thiocyanate, guanidine, diphenylguanidine, and the like; surfactants such as sodium dodecyl sulfate; glutaraldehyde, dimethyl suberimidate dihydrochloride, R mercaptoethanol, dithiothreitol, and the like. Any one of these protein modifying agents may be used, or two or more of them may be used in combination. Among these, carbamide compounds, guanidine compounds, and surfactants are preferably used, and urea derivatives, guanidine hydrochloride, diphenylguanidine, and sodium dodecyl sulfate are more preferably used. Examples of urea derivatives include urea, methylurea, ethylurea, propylurea, butylurea, pentylurea, hexylurea, cyclohexylurea, N,N'-dimethylurea, N,N'-diethylurea, N,N,N',N'-tetramethylurea, N,N-dimethyl-N',N'-diphenylurea, diethylurea, dipropylurea, dibutylurea, dipentylurea, dihexylurea, and salts thereof. Among these, urea is preferred. Further, the rubber composition of the present invention may contain both carbamide compounds and guanidine compounds to improve the scorch resistance of the rubber composition.

The amount of protein modifying agent used depends on the type of protein modifying agent, but may be in any amount that reduces the stability of the higher order structure of the protein. The content of the protein modifying agent in the rubber composition is preferably 0.01 to 10 parts by mass, more preferably 0.05 to 5 parts by mass, further preferably 0.1 to 3.0 parts by mass, and further more preferably 0.5 to 2.5 parts by mass with respect to 100 parts by mass of the elastomer. When two or more kinds of protein modifying agents are contained, the total content is preferably within the above-mentioned numerical value range. When urea is used as the protein modifying agent, for example, it may be contained in an amount of preferably 0.01 to 10 parts by mass, more preferably 0.05 to 5 parts by mass, and further preferably 0.1 to 3 parts by mass with respect to 100 parts by mass of the elastomer. When guanidine hydrochloride or diphenylguanidine is used as the protein modifying agent, for example, it may be contained in an amount of preferably 0.01 to 10 parts by mass, more preferably 0.05 to 5 parts by mass, and further preferably 0.1 to 3 parts by mass with respect to 100 parts by mass of the elastomer. When sodium dodecyl sulfate is used as the protein modifying agent, for example, it may be contained in an amount of preferably 0.01 to 10 parts by mass, more preferably 0.05 to 5 parts by mass, and further preferably 0.1 to 3 parts by mass with respect to 100 parts by mass of the elastomer. In particular, when both the carbamide compound (for example, urea) and the guanidine compound (for example, guanidine hydrochloride or diphenylguanidine) are used as the protein modifying agent, the ratio of the content of the guanidine compound to the content of the carbamide compound (guanidine compound/carbamide compound) is preferably 0.01 to 3, more preferably 0.05 to 2, and further preferably 0.1 to 1. A rubber composition exhibiting particularly excellent viscoelastic properties can be obtained if the ratio of the content of the guanidine compound to the content of the carbamide compound is within the above-mentioned ranges.

(3) Elastomer

The elastomer in the rubber composition of the present invention is at least one elastomer having a glass transition point of 25° C. or lower, selected from the group consisting of natural rubber and deproteinized natural rubber (when the elastomer comprises two or more polymers, it is a mixture thereof). Here, the deproteinized natural rubber is a natural rubber which has been deproteinized, and although the protein content thereof is lower than that of normal natural rubber, the protein content has not been completely removed. The natural rubber or deproteinized natural rubber contains impurities derived from natural rubber (proteins, phospholipids and the like), which caused the problem that they inhibit the coupling reaction of the silane coupling agent and resulting in that the mixed inorganic material such as silica is not sufficiently dispersed in the elastomer. The present invention is to solve such problem and the elastomer in the rubber composition of the present invention comprises natural rubber or deproteinized natural rubber in whole or at least in part.

The glass transition point of the elastomer in the rubber composition of the present invention is 25° C. or lower, preferably 10° C. or lower, and more preferably 0° C. or lower. It is preferable because when the glass transition point of the elastomer is within this range, the rubber composition exhibits rubber-like elasticity at room temperature. In the present invention, the glass transition point is a glass transition point measured by differential scanning calorimetry (DSC-Differential Scanning Calorimetry). The heating rate is preferably set to 10° C./min.

Elastomers which may optionally be included in addition to natural rubber and deproteinized natural rubber include known natural or synthetic polymers having a glass transition point of 25° C. or lower, which may be liquid or solid. Specific examples thereof include at least one selected from the group consisting of butadiene rubber, nitrile rubber, silicone rubber, isoprene rubber, styrene-butadiene rubber, isoprene-butadiene rubber, styrene-isoprene-butadiene rubber, ethylene-propylene-diene rubber, halogenated butyl rubber, halogenated isoprene rubber, halogenated isobutylene copolymer, chloroprene rubber, butyl rubber and halogenated isobutylene-p-methylstyrene rubber. They may be used as any blends with natural rubber or deproteinized natural rubber.

Elastomers which may be contained in addition to the above-mentioned natural rubber and deproteinized natural rubber are preferably one or more polymers selected from the group consisting of butadiene rubber, isoprene rubber, styrene-butadiene rubber, ethylene-propylene-diene rubber, halogenated butyl rubber, butyl rubber and halogenated isobutylene-p-methylstyrene rubber among the above-mentioned polymers.

It is preferred that the elastomer in the rubber composition of the present invention comprises natural rubber and/or deproteinized natural rubber.

The weight-average molecular weight of the elastomer in the rubber composition of the present invention is preferably 1,000 to 3,000,000, more preferably 10,000 to 1,000,000. In the present invention, the weight-average molecular weight is a weight-average molecular weight (in terms of polystyrene) measured by gel permeation chromatography (GPC). It is preferable to use tetrahydrofuran (THF), N,N-dimethylformamide (DMF), or chloroform as a solvent for the measurement.

The content of the compound represented by Formula (1) in the rubber composition of the present invention is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1.0 to 5.0 parts by mass, and particularly even more preferably 1.0 to 3.4 parts by mass, with respect to 100 parts by mass of the elastomer. The content of the compound represented by Formula (1) is preferably 0.1 to 30 parts by mass, more preferably 0.5 to 20 parts by mass, and further preferably 1.0 to 15 parts by mass with respect to 100 parts by mass of the total amount of the inorganic material contained in the rubber composition.

In addition, by incorporating a compound represented by Formula (1) above and a protein modifying agent into the rubber composition of the present invention, it is possible to improve the mechanical strength and fuel efficiency of the elastomer. In addition, since the kneading process can be shortened, it is also possible to reduce the cost.

(4) Silane compound other than compound represented by Formula (1)

The silane coupling agent composition and the rubber composition of the present invention may further contain a silane compound other than the compound represented by Formula (1) (also may be referred to as the "other silane compound" in the present specification). When a rubber composition containing a silane compound other than the compound represented by Formula (1) is subjected to a vulcanization reaction, the silane compound other than the compound represented by Formula (1) is incorporated into the vulcanization reaction, so that the silane compound other than the compound represented by Formula (1) functioning as a silane coupling agent reacts with the silane compound other than the compound represented by Formula (1). This reaction is considered to have a synergistic effect of increasing the coupling efficiency. In the silane coupling agent composition and the rubber composition of the present invention, the silane compound other than the compound represented by Formula (1) is preferably a sulfur-containing silane compound (other sulfur-containing silane compound) other than the compound represented by Formula (1).

The content of the silane compound other than the compound represented by Formula (1) is preferably 0.01 to 27 parts by mass and more preferably 0.03 to 18 parts by mass with respect to 100 parts by mass of the elastomer. The content of the silane compound other than the compound represented by formula (1) is preferably 0.01 to 27 parts by mass, more preferably 0.05 to 18 parts by mass, and further preferably 0.1 to 13.5 parts by mass with respect to 100 parts by mass of the total amount of the inorganic material contained in the rubber composition.

In the rubber composition of the present invention, the total content of the compound represented by Formula (1) and the silane compound other than the compound represented by Formula (1) is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1.0 to 5.0 parts by mass, and particularly even more preferably 1.0 to 3.4 parts by mass, with respect to 100 parts by mass of the elastomer. The total content of the compound represented by Formula (1) and the silane compound other than the compound represented by Formula (1) is preferably 0.1 to 30 parts by mass, more preferably 0.5 to 20 parts by mass, and further preferably 1.0 to 15 parts by mass, with respect to 100 parts by mass of the total amount of the inorganic material contained in the rubber composition.

In the silane coupling agent composition and the rubber composition of the present invention, the ratio of the content of a silane compound other than the compound represented by Formula (1) to the total content of the compound represented by Formula (1) and the silane compound other than the compound represented by Formula (1) is preferably 0.1 to 0.9 on a mass basis, and more preferably 0.2 to 0.8.

As a silane compound other than the compound represented by Formula (1), it is possible to use a compound represented by, for example, Formula (11):

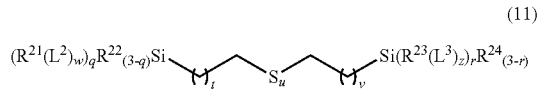
(11)

wherein
t and v are each independently an integer of 0 to 10;
u is an integer of 2 to 10;
q and r are each independently an integer of 1 to 3;
w and z are each independently an integer of 0 or 1;
$L^2$ and $L^3$ are each independently a hydrocarbon group optionally containing at least one heteroatom selected from the group consisting of nitrogen, oxygen and sulfur;
$R^2$ and $R^{23}$ are each independently an alkoxy group or an amino group substituted with one or more alkyl groups; and
$R^{22}$ and $R^{24}$ are each independently a hydrogen atom or an alkyl group.

In Formula (11) above, t and v each independently represent an integer of 0 to 10, preferably an integer of 0 to 5, more preferably an integer of 1 to 3, and further preferably 2.
u represents an integer of 2 to 10 and more preferably an integer of 2 to 8.
g and r each independently represents an integer of 1 to 3, preferably an integer of 2 to 3, and more preferably 3.
w and z each independently represents an integer of 0 or 1 and preferably 0.
$L^2$ and $L^3$ are each independently a hydrocarbon group optionally containing at least one heteroatom selected from the group consisting of nitrogen, oxygen, and sulfur, preferably a hydrocarbon group having 1 to 30 carbons, optionally containing at least one heteroatom selected from the group consisting of nitrogen, oxygen, and sulfur, more preferably a hydrocarbon group having 1 to 20 carbons, optionally containing at least one heteroatom selected from the group consisting of nitrogen, oxygen, and sulfur, and further preferably a hydrocarbon group having 1 to 10 carbons, optionally containing at least one heteroatom selected from the group consisting of nitrogen, oxygen, and sulfur.

$R^2$ and $R^{23}$ each independently represents a hydrolyzable group, and an alkoxy group, more preferably an alkoxy group having 1 to 30 carbons, more preferably an alkoxy group having 1 to 20 carbons, or an amino group substituted with one or more alkyl groups, more preferably an amino group substituted with one or more alkyl groups having 1 to 30 carbons, and more preferably an amino group substituted with one or more alkyl groups having 1 to 20 carbons. Specifically, examples of the alkoxy group include a methoxy group, ethoxy group, propoxy group, isopropoxy group, butoxy group, and isobutoxy group, and among these, a methoxy group or an ethoxy group is preferable. Examples of the amino group substituted with one or more alkyl groups include an N-methylamino group, N,N-dimethylamino group, N-ethylamino group, N,N-diethylamino group, and N-isopropylamino group, and among these, an N-methylamino group or an N-ethylamino group is preferable. Note that, the alkoxy group and the amino group may be bonded to silicon (Si) via a connecting group consisted of a hydrocarbon group optionally containing at least one heteroatom selected from the group consisting of nitrogen, oxygen, and sulfur.

In addition, $R^{22}$ and $R^{24}$ each independently represents a hydrogen atom or an alkyl group, more preferably an alkyl group having 1 to 30 carbons, further preferably an alkyl group having 1 to 20 carbons, and specific examples thereof include a methyl group, ethyl group, propyl group, isopropyl group, butyl group, isobutyl group, tert-butyl group, pentyl group, cyclopentyl group, hexyl group, and cyclohexyl group, among which a methyl group and an ethyl group are preferable.

The content of the compound represented by Formula (11) above in the rubber composition of the present invention is preferably 0.01 to 27 parts by mass and more preferably 0.03 to 18 parts by mass with respect to 100 parts by mass of the elastomer. The content of the compound represented by Formula (11) above in the rubber composition of the present invention is preferably 0.01 to 27 parts by mass, more preferably 0.05 to 18 parts by mass, further preferably 0.1 to 13.5 parts by mass with respect to 100 parts by mass of the total amount of the inorganic material contained in the rubber composition.

As the silane compound other than the compound represented by Formula (1), it is possible to use a compound represented by Formula (46), particularly a silane compound having the following structure, in addition to the compound represented by Formula (11) above.

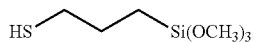

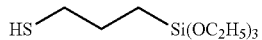

(5) Inorganic Materials

Examples of inorganic materials contained in the rubber composition of the present invention include silica, carbon black, calcium carbonate, titanium oxide, clay and talc, which may be used alone or in combination of two or more thereof. Among these, silica or carbon black is preferably used because it is possible to further improve the mechanical properties and heat resistance. The amount of the inorganic material added is preferably from 0.1 to 500 parts by mass, and more preferably from 1 to 300 parts by mass with respect to 100 parts by mass of the elastomer.

Silica is not particularly limited, and examples thereof include dry method silica, wet method silica, colloidal silica and precipitated silica. Preferred among these is wet method silica having hydrated silicic acid as a main component. These silicas may be used alone or in combination of two or more thereof. The amount of silica added is preferably 1 to 300 parts by mass, more preferably 5 to 200 parts by mass, and further preferably 10 to 150 parts by mass with respect to 100 parts by mass of the elastomer. The specific surface area of these silicas is not particularly limited, and reinforcing properties, abrasion resistance, heat generation properties, and the like can be sufficiently improved when the specific surface area is generally in the range of 10 to 400 $m^2/g$, preferably 20 to 300 $m^2/g$, and further preferably 120 to 190 $m^2/g$ according to nitrogen adsorption specific surface area (BET method). Here, the nitrogen adsorption specific surface area is a value measured by the BET method according to ASTM D3037-81.

Carbon black is appropriately selected and used according to the application. Generally, carbon black is classified into hard carbon and soft carbon based on the particle size. Soft carbon has a low reinforcing property against rubber, and hard carbon has a high reinforcing property against rubber. In the rubber composition of the present invention, it is preferable to use a hard carbon having a particularly high reinforcing property. The amount of carbon black added is preferably from 1 to 300 parts by mass, more preferably from 5 to 200 parts by mass, and further preferably from 10 to 150 parts by mass with respect to 100 parts by mass of the elastomer. The carbon black may be added to the rubber composition or may be added to the silane coupling agent composition.

(6) Other Processing Aids

The rubber composition of the present invention may contain other processing aids as long as the function is not impaired such as a vulcanizing agent such as sulfur, cross-linking agent, vulcanization accelerator, cross-linking accelerator, vulcanization acceleration aid, anti-aging agent, softening agent, various oils, antioxidant, anti-aging agent, filler, and plasticizer.

Examples of the anti-aging agent include compounds such as hindered phenol compounds, aliphatic compounds and aromatic hindered amine compounds, and they are added in an amount of 0.1 to 10 parts by mass, more preferably 1 to 5 parts by mass, based on 100 parts by mass of the elastomer. Examples of the antioxidant include butyl hydroxy toluene (BHT), butyl hydroxy anisole (BHA), and the like. They are preferably added in an amount of 0.1 to 10 parts by mass, more preferably 1 to 5 parts by mass, based on 100 parts by mass of the elastomer.

Examples of a colorant include inorganic pigments such as titanium dioxide, zinc oxide, ultramarine, red iron oxide, lithopone, lead, cadmium, iron, cobalt, aluminum, hydrochloride, and sulfate, azo pigment, copper phthalocyanine pigment, and the like. They are added in an amount from 0.1 to 10 parts by mass, more preferably 1 to 5 parts by mass, based on 100 parts by mass of the elastomer.

Examples of the vulcanizing agent include sulfur-based vulcanizing agents such as powder sulfur, precipitated sulfur, highly dispersible sulfur, surface-treated sulfur, insoluble sulfur, dimorpholin disulfide, and alkylphenol disulfide, and zinc oxide, magnesium oxide, litharge, p-quinone dioxam, p-dibenzoylquinonedioxime, tetrachloro-p-benzoquinone, poly-p-dinitrobenzene, methylenedianiline, phenol resin, brominated alkylphenol resin, chlorinated alkylphenol resin, and the like.

Examples of the vulcanization accelerator include fatty acids such as acetyl acid, propionic acid, butane acid, stearic acid, acrylic acid, and maleic acid; fatty acid zincs such as zinc acetylate, zinc propionate, zinc butanoate, zinc stearate, zinc acrylate, and zinc maleate; and fatty acid zinc, and zinc oxide.

Examples of the vulcanization acceleration aid include vulcanization acceleration aid of thiurams such as tetramethylthiuram disulfide (TMTD), tetraethylthiuram disulfide (TETD), and tetramethylthiuram monosulfide (TMTM); aldehyde/ammonias such as hexamethylenetetramine; guanidines such as diphenylguanidine; thiazoles such as 2-mercaptobenzothiazole (MBT) and dibenzothiazyl disulfide (DM); sulfenamides such as N-cyclohexyl-2-benzothiazyl sulfenamide (CBS) and N-t-butyl-2-benzothiazyl sulfenamide (BBS); and dithiocarbamates such as dimethyl dithiocarbamic acid (ZnPDC).

In the present invention, other processing aids can be used as a rubber composition by kneading with a known rubber kneading machine, for example, a roller, Banbury mixer, kneader, and the like, and vulcanizing under any conditions. The amount of these other processing aids to be added can also be set to a conventional general amount as long as it does not violate the purpose of the present invention.

(7) Method for Producing Rubber Composition

The method for producing a rubber composition of the present invention comprises a step of kneading the silane compound above, the protein modifying agent above, the elastomer having a glass transition point of 25° C. or lower above, and the inorganic material above. The method may further comprise a step of pre-kneading the protein modifying agent and the elastomer before the step of kneading the silane compound, the protein modifying agent, the elastomer and the inorganic material. In addition, the silane compound may contain a silane compound other than the compound represented by Formula (1). The process for producing a rubber composition of the present invention preferably comprises a step of kneading the silane compound, the protein modifying agent, the elastomer having a glass transition point of 25° C. or lower, the inorganic material, and the vulcanization acceleration aid.

The method for producing the rubber composition described above may preferably further comprise a step of kneading the vulcanizing agent. More preferably, the method for producing the rubber composition may further comprise a step of kneading the vulcanizing agent and the vulcanization accelerator.

The total content of the compound represented by Formula (1) and the silane compound other than the compound represented by Formula (1) in the rubber composition is preferably 0.1 to 30 parts by mass, more preferably 0.3 to 20 parts by mass, further preferably 0.4 to 15 parts by mass, further more preferably 0.7 to 10 parts by mass, particularly preferably 0.7 to 6.9 parts by mass, particularly more preferably 1 to 5.0 parts by mass, and particularly even more preferably 1 to 3.4 parts by mass with respect to 100 parts by mass of the elastomer. When the rubber composition contains a silane compound other than the compound represented by formula (1), the ratio of the content of the silane compound other than the compound represented by Formula (1) to the total content of the compound represented by Formula (1) and the silane compound other than the compound represented by Formula (1) is preferably 0.1 to 0.9 and more preferably 0.2 to 0.8 on a mass basis.

In each of the above-mentioned steps, the above-mentioned other processing aids may be appropriately blended within a range not impairing the function of the rubber composition.

(8) Cross-Linked Product of the Rubber Composition of the Present Invention

Using the rubber composition of the present invention, a cross-linked product of the rubber composition can be produced according to conventionally known methods and common general knowledge widely known to those skilled in the art. For example, the rubber composition is extruded, then molded using a molding machine, subsequently heated and pressurized using a vulcanizing machine, thereby forming a cross-link to give a cross-linked product.

(9) Tire

Using the rubber composition, a tire can be produced by a conventionally known method and common general knowledge widely known to a person skilled in the art. For example, the rubber composition is extruded and then molded using a tire molding machine, subsequently heated and pressurized using a vulcanizing machine, thereby forming a cross-link to give a tire. In one embodiment, the tire of the present invention is a tire comprising the cross-linked product.

By producing a tire using the rubber composition of the present invention, it is possible to achieve a balanced improvement in wet grip performance and low fuel consumption in tire performance.

EXAMPLES

Hereinafter, the present invention shall be described in more details with reference to the Examples, but the present invention shall not be limited to these Examples.

1. Preparation Example 1: Synthesis of Silane Compound 1 (VNB-SSi)

A 100-mL 2-neck flask was equipped with a ball stopper and a 3-way cock connected to a vacuum line, a stirrer bar was placed in the flask, and using a vacuum line, deaeration-nitrogen substitution in the system were repeated 10 times while heating with a dryer under ordinary pressure nitrogen atmosphere. 38.65 g (0.317 mol) of 5-Vinyl-2-Norbornene (VNB) was placed in the flask, and 71.93 g of toluene solvent was injected using a syringe. Subsequently, the mixture was stirred and dissolved using a stirrer. Then, 68.6 g (0.288 mol) of 3-mercaptopropyltriethoxysilane was injected using a syringe. Finally, 0.4725 g (2.88 mmol) of azobisisobutyronitrile was added while flowing nitrogen, followed by nitrogen bubbling for 20 minutes. The flask was immersed in an oil bath and allowed to react by gradually raising the bath temperature to 70° C. 6 hours after reaching 70° C., the oil bath was removed from the flask which was left to stand until it reached room temperature (25° C.). Next, toluene and the unreacted 5-vinyl-2-norbornene (VNB) were distilled off under reduced pressure to obtain 98.64 g (95% yield) of the intended silane-modified vinyl norbornene (VNB-SSi). The result of $^1$H-NMR measurement of the obtained compound is shown in FIG. 1. It was confirmed by $^1$H-NMR measurement and $^{13}$C-NMR measurement that the silane introduction rate was 100% and the double bond of the norbornene ring had disappeared.

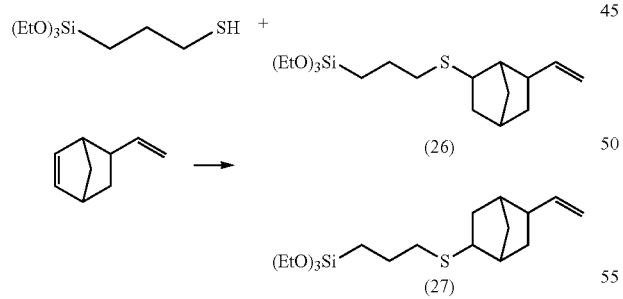

Detection of Stereoisomers of Silane Compound 1

Figure 2:
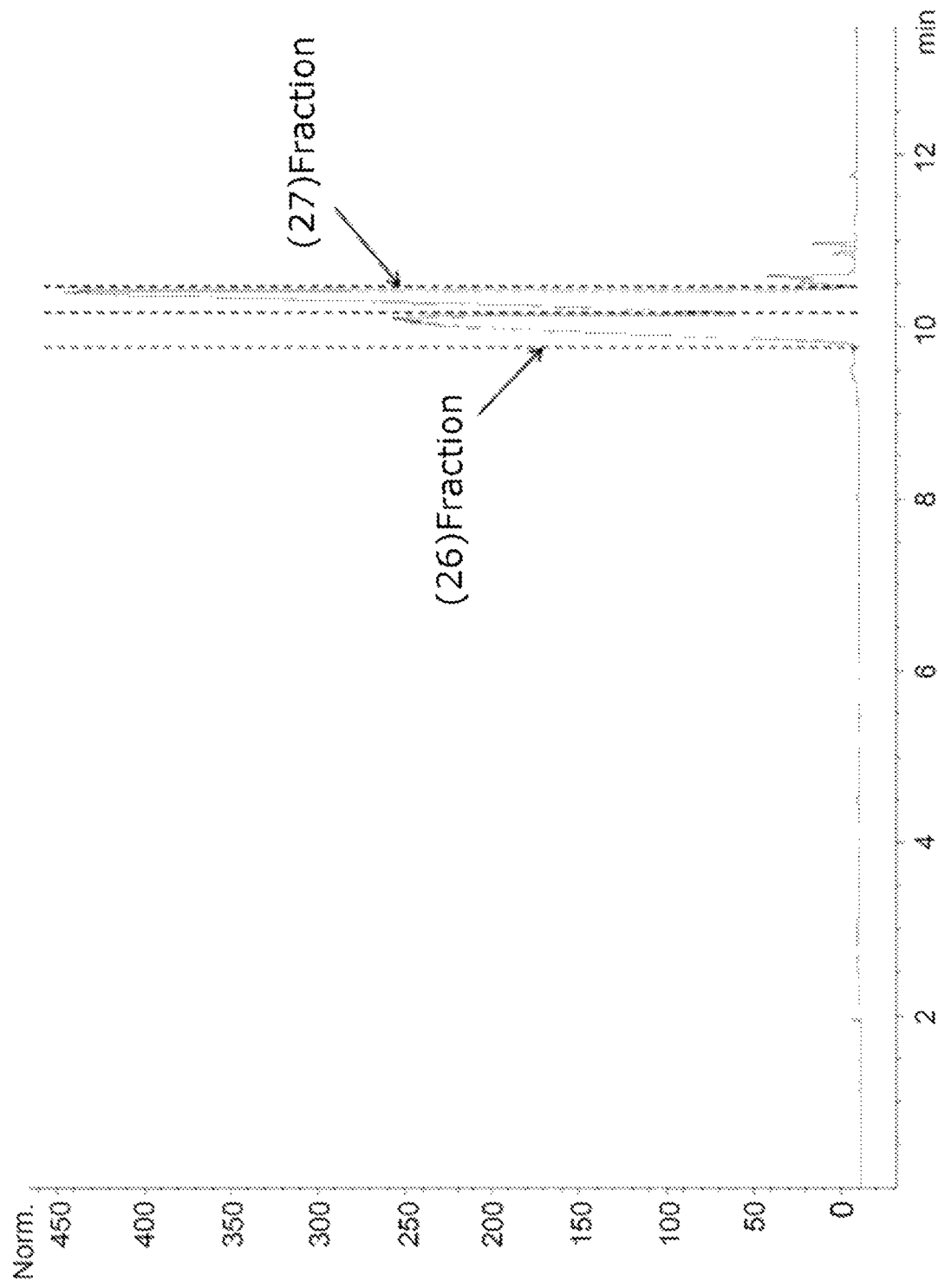
FIG. 2 is a chromatogram showing that the silane compound 1 synthesized in Preparation Example 1 was fractionated into a (26) fraction and a (27) fraction by gas chromatography, and the fractions were separated.
Figure 3:
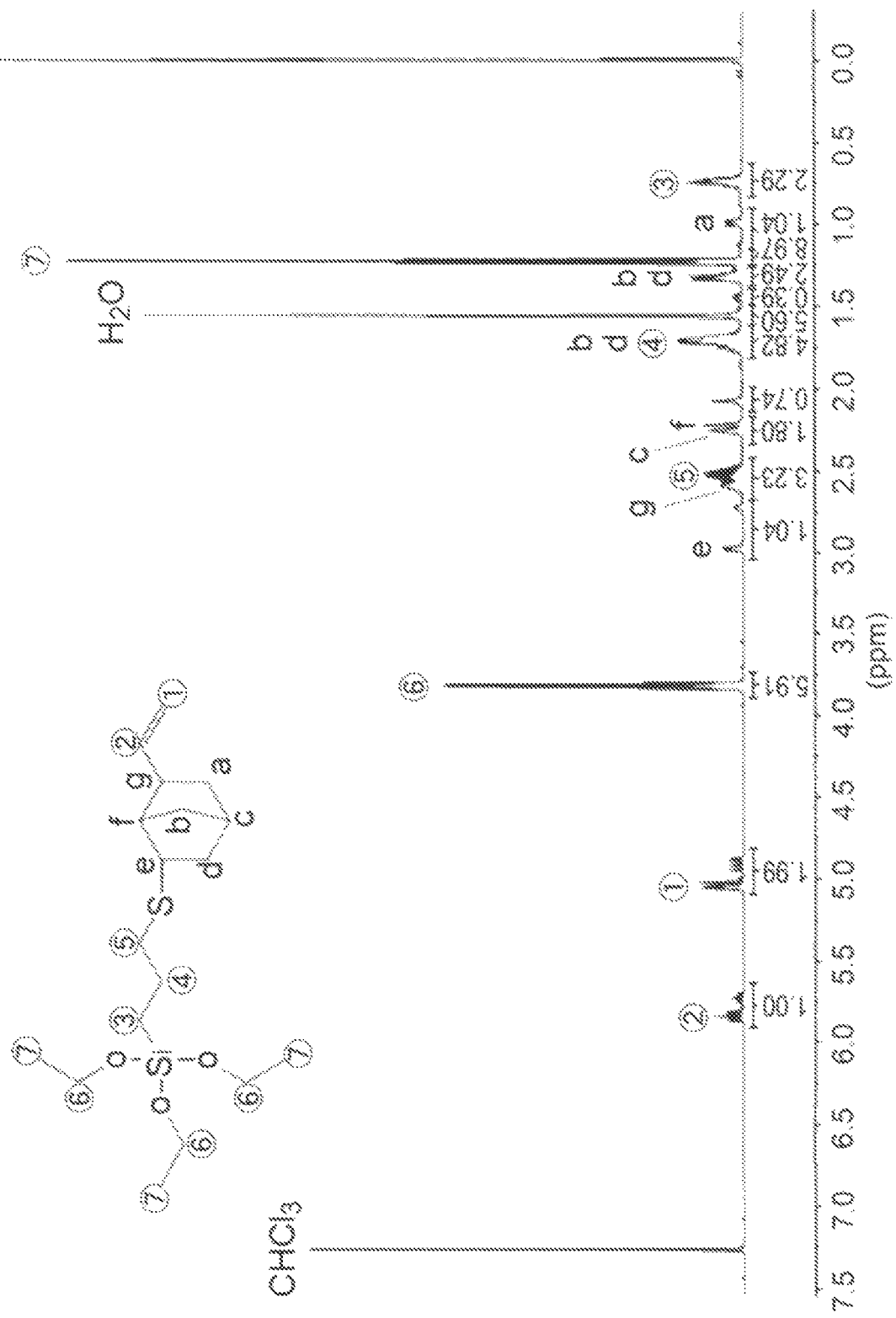
FIG. 3 is a $^1$H-NMR chart showing the (26) fraction of the silane compound 1 synthesized in Preparation Example 1. The peaks indicated by a to g and integers 1 to 7 surrounded by circles represent peaks of protons bonded to each carbon atom (shown in FIG. 3) of the compound represented by Formula (26).
Figure 4:
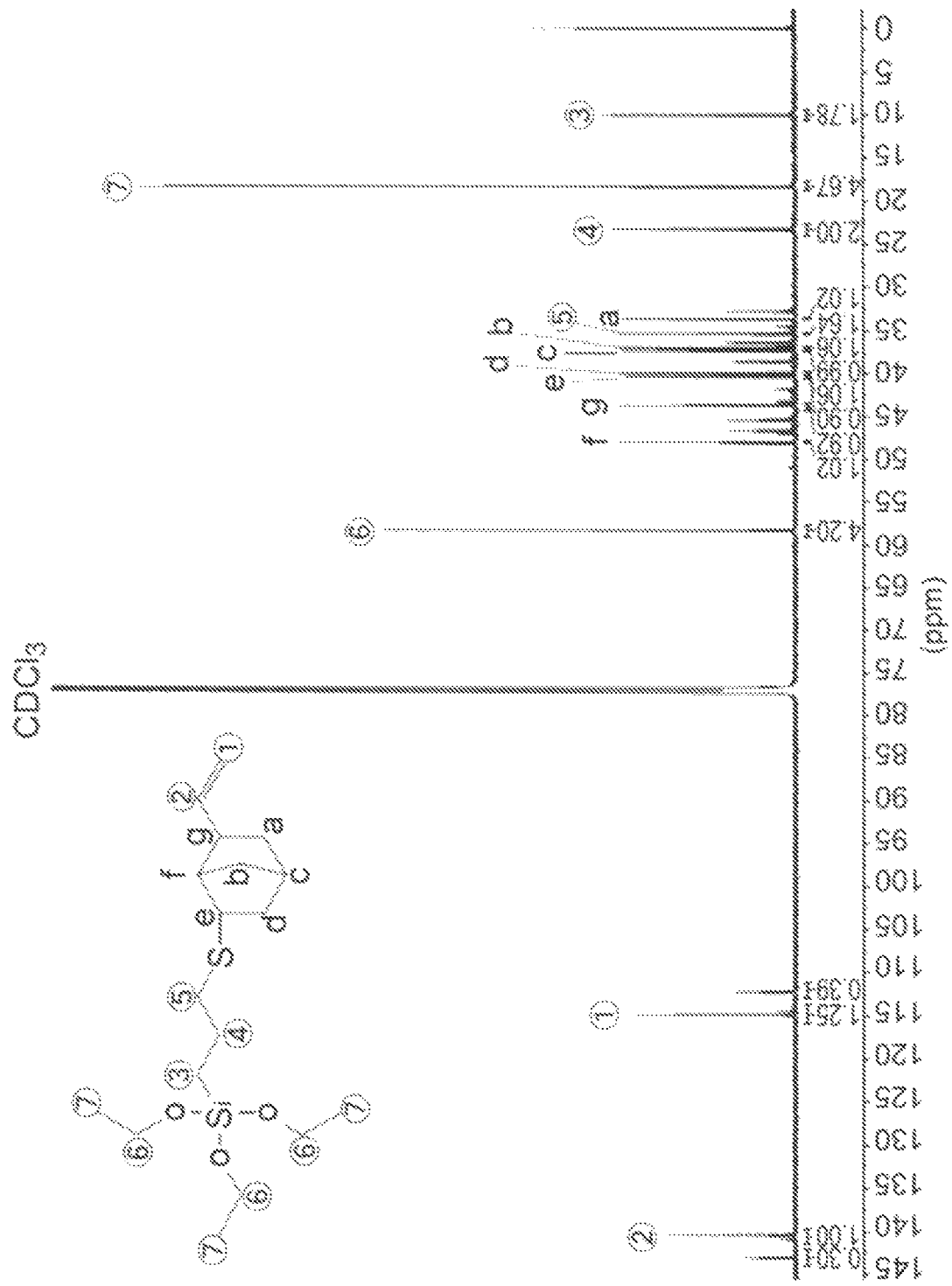
FIG. 4 shows a $^{13}$C-NMR chart of the (26) fraction of the silane compound 1 synthesized in Preparation Example 1. The peaks indicated by a to g and integers 1 to 7 surrounded by circles represent peaks of each carbon atom (shown in FIG. 4) of the compound represented by Formula (26).
Figure 5:
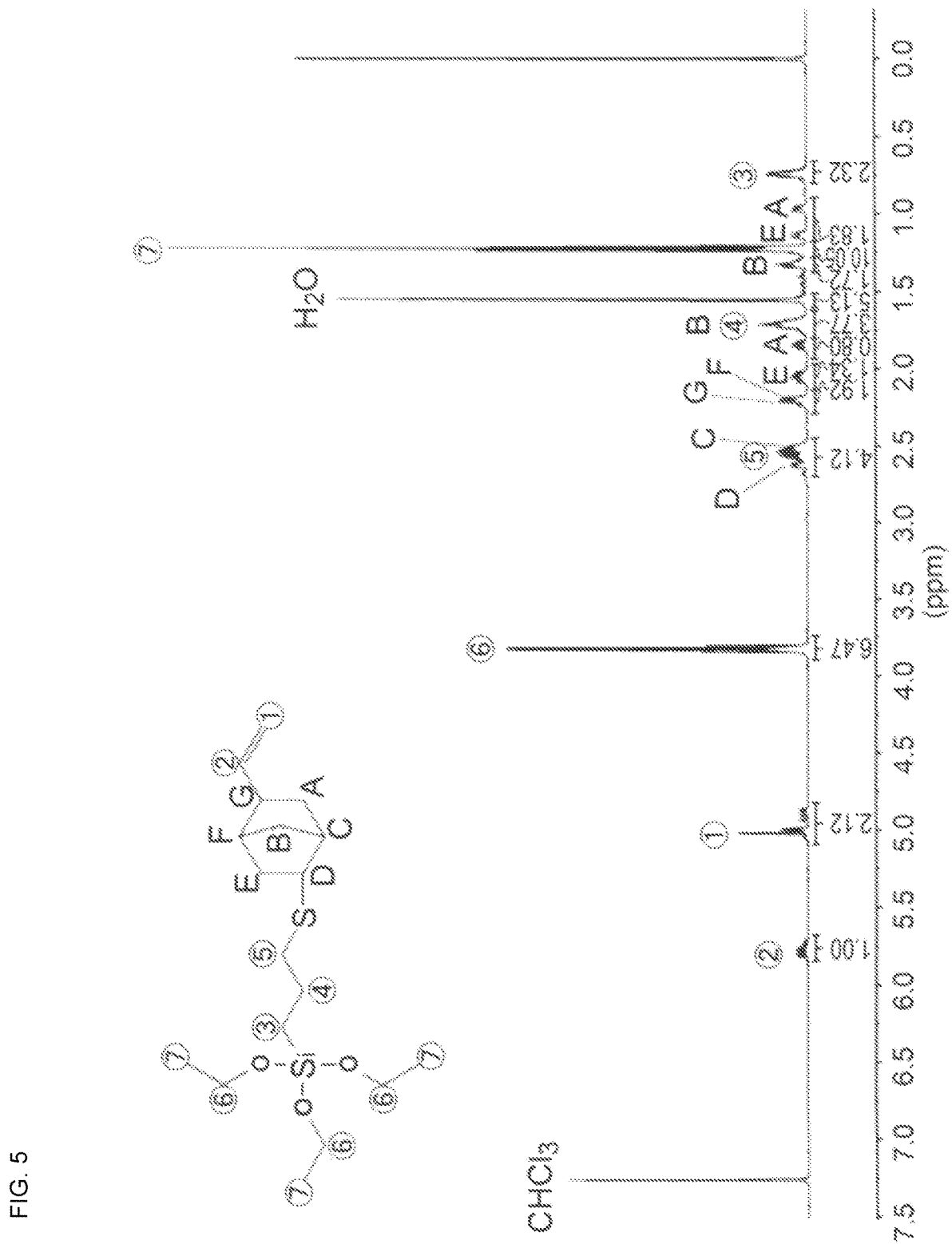
FIG. 5 shows a $^1$H-NMR chart of the (27) fraction of the silane compound 1 synthesized in Preparation Example 1. The peaks indicated by A to G and 1 to 7 surrounded by circles represent peaks of protons bonded to each carbon atom (shown in FIG. 5) of the compound represented by formula (27).
Figure 6:
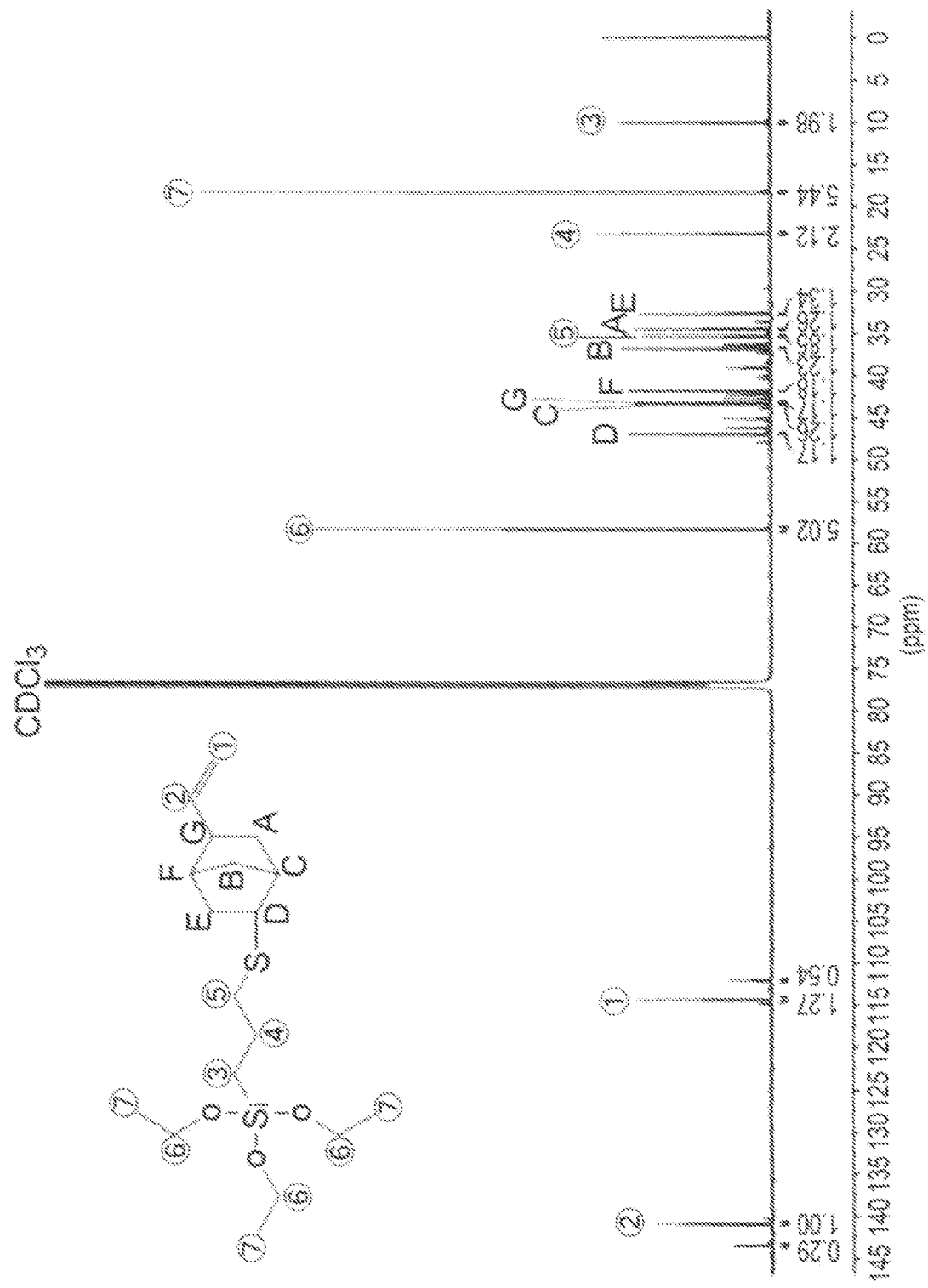
FIG. 6 shows a $^{13}$C-NMR chart of the (27) fraction of the silane compound 1 synthesized in Preparation Example 1. The peaks indicated by A to G and 1 to 7 surrounded by circles represent peaks of protons bonded to each carbon atom (shown in FIG. 6) of the compound represented by formula (27).

The obtained Silane Compound 1 was fractionated by gas chromatography into a fraction containing a large amount of the compound represented by Formula (26) above ("fraction (26)") and a fraction containing a large amount of the compound represented by Formula (27) above ("fraction (27)"), and dispensed (FIG. 2). The $^1$H-NMR measurement result of the fraction (26) is shown in FIG. 3, and the $^{13}$C-NMR measurement result is shown in FIG. 4. The $^1$H-NMR measurement result of the fraction (27) is shown in FIG. 5, and the $^{13}$C-NMR measurement result is shown in FIG. 6. In the chemical structures represented by Formulae (26) and (27), it was found that a peak of a proton bonded to a carbon atom (a carbon atom indicated by an integer 2 surrounded by a circle in FIG. 3 or FIG. 5), the one which was directly bonded to a norbornene ring of a double bond of a vinyl group was split. From this data, it was inferred that there were two stereoisomers: an isomer (a syn isomer) in which a vinyl group bonded to a norbornene ring extends forward toward the paper face in the same manner as a cross-linked structure of a norbornene ring; and an isomer (an anti-isomer) in which a vinyl group bonded to a norbornene ring extends backward toward the paper face opposite to a cross-linked structure of a norbornene ring. Similarly, it was inferred that there were two stereoisomers: an isomer (a syn isomer) in which a sulfur atom bonded to a norbornene ring extends forward toward the paper face in the same manner as a cross-linked structure of a norbornene ring; and an isomer (an anti-isomer) in which a sulfur atom bonded to a norbornene ring extends backward toward the paper face opposite to a cross-linked structure of a norbornene ring. As described above, the obtained Silane Compound 1 is inferred to be a mixture of 8 stereoisomers represented by the following structural formulae.

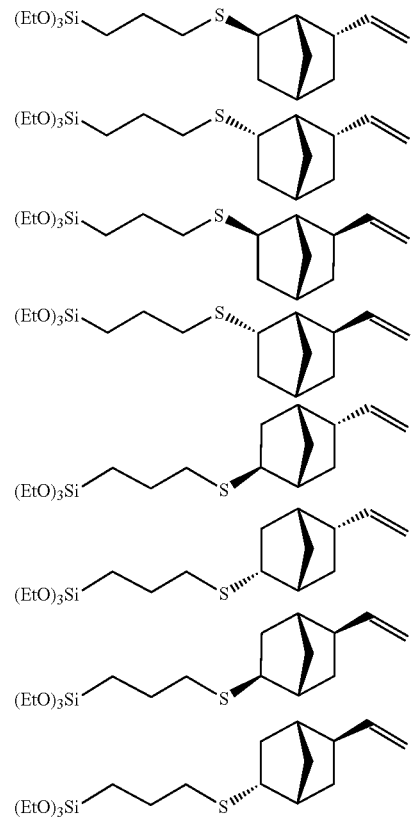

2. Preparation Example 2: Synthesis of Silane Compound 2 (DCPD-SSi)

Figure 7:
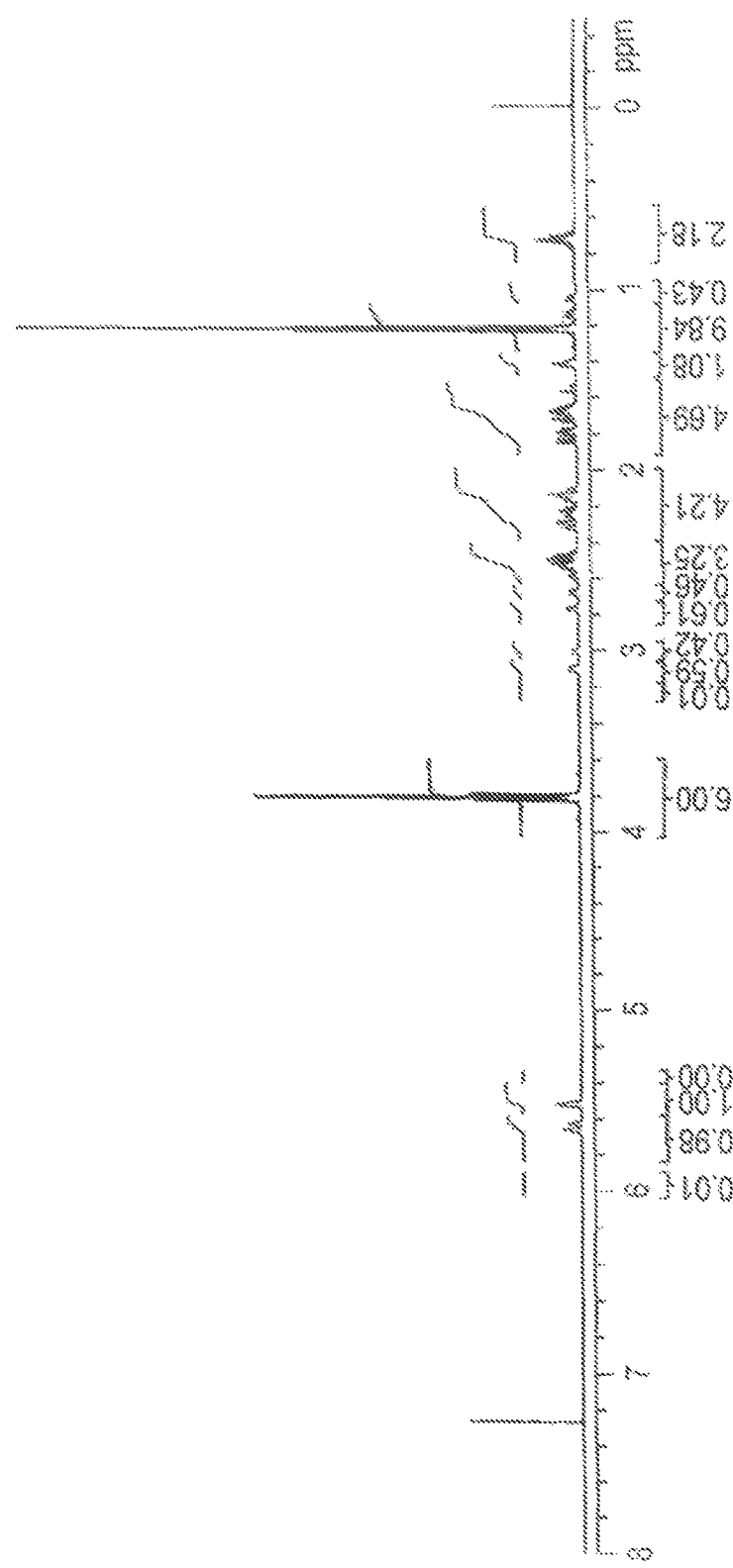
FIG. 7 shows a $^1$H-NMR chart of the silane compound 2 synthesized in Preparation Example 2.

A 100-mL 2-neck flask was equipped with a ball stopper and a 3-way cock connected to a vacuum line, a stirrer bar was placed in the flask, and using a vacuum line, deaeration-nitrogen substitution in the system were repeated 10 times while heating with a dryer under ordinary pressure nitrogen atmosphere. 6.62 g (0.0501 mol) of dicyclopentadiene (DCPD) was introduced in the flask, and 4.33 g of toluene solvent was injected using a syringe. Subsequently, the mixture was stirred and dissolved using a stirrer. Then, 11.9 g (0.0500 mol) of 3-mercaptopropyltriethoxysilane was injected using a syringe. Finally, 0.125 g (0.761 mmol) of azobisisobutyronitrile was added while flowing nitrogen, followed by nitrogen bubbling for 20 minutes. The flask was immersed in an oil bath and allowed to react by gradually raising the bath temperature to 70° C. Six hours after reaching 70° C., the oil bath was removed from the flask which was left to stand until it reached room temperature (25° C.). Next, toluene and unreacted dicyclopentadiene (DCPD) were removed by distillation under reduced pressure, and 17.6 g (95% yield) of the target silane-modified dicyclopentadiene (DCPD-SSi) was obtained. The result of $^1$H-NMR measurement of the obtained compound is shown in FIG. 7. By $^1$H-NMR and $^{13}$C-NMR measurement, it was confirmed that the silane introduction rate was 100% and the double bond of the norbornene ring had disappeared.

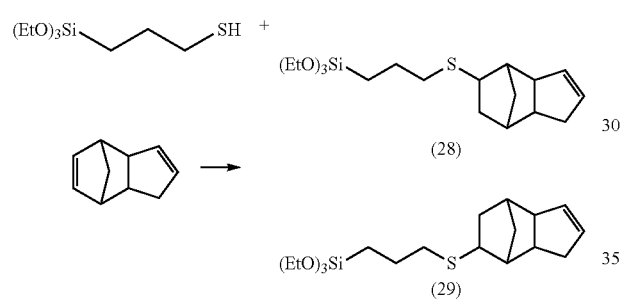

The obtained Silane Compound 2 is inferred to be a mixture of 8 stereoisomers represented by the following structural formulae.

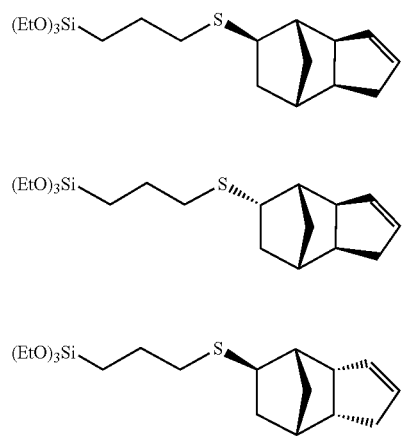

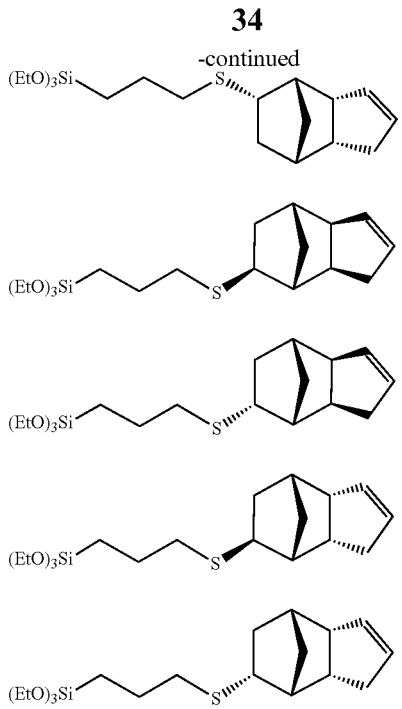

3. Preparation Example 3: Synthesis of Silane Compound 3 (ENB-SSi)

A 100-mL 2-neck flask was equipped with a ball stopper and a 3-way cock connected to a vacuum line, a stirrer bar was placed in the flask, and using a vacuum line, deaeration-nitrogen substitution in the system were repeated 10 times while heating with a dryer under ordinary pressure nitrogen atmosphere. 6.73 g (0.0551 mol) of 5-ethylidene-2-norbornene (ENB) was introduced in the flask, and 4.33 g of toluene solvent was injected using a syringe. After that, the mixture was stirred and dissolved using a stirrer. Then, 11.9 g (0.0498 mol) of 3-mercaptopropyltriethoxysilane was injected using a syringe. Finally, 0.123 g (0.746 mmol) of azobisisobutyronitrile was added while flowing nitrogen, followed by nitrogen bubbling for 20 minutes. The flask was immersed in an oil bath and allowed to react by gradually raising the bath temperature to 70° C. 6 hours after reaching 70° C., the oil bath was removed from the flask which was left to stand until it reached room temperature (25° C.). Next, toluene and unreacted 5-ethylidene-2-norbornene (ENB) were removed by distillation under reduced pressure, and 17.1 g (95% yield) of the target silane-modified 5-ethylidene-2-norbornene (ENB-SSi) was obtained. It was confirmed by measurement of $^1$H-NMR and $^{13}$C-NMR that the introduction rate of silane was 100% and the double bond of the norbornene ring had disappeared.

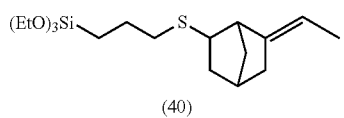

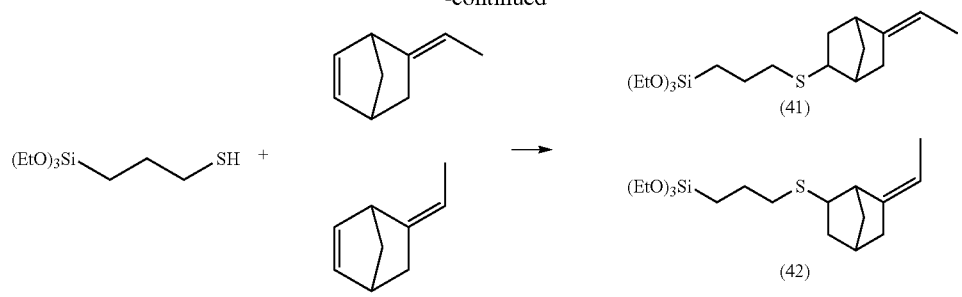

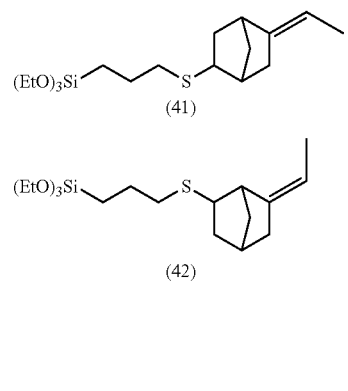

The obtained Silane Compound 3 is inferred to be a mixture of 8 stereoisomers represented by the following structural formulae.

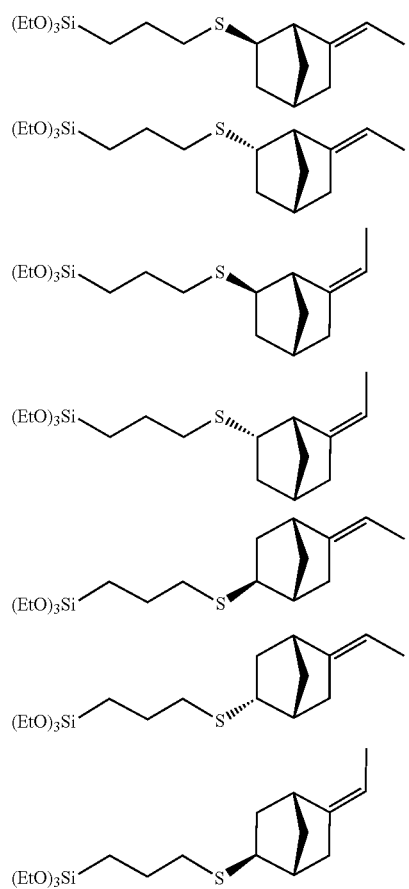

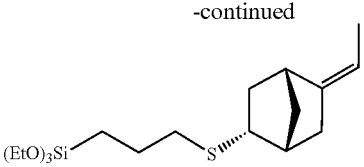

4. Preparation Example 4: Synthesis of Silane Compound 4 (VDMON-SSi)

A 100-mL 2-neck flask was equipped with a ball stopper and a 3-way cock connected to a vacuum line, a stirrer bar was placed in the flask, and using a vacuum line, deaeration-nitrogen substitution in the system were repeated 10 times while heating with a dryer under ordinary pressure nitrogen atmosphere. 5.73 g (0.0308 mol) of vinyldimethano octahydronaphthalene (VDMON) was introduced in the flask, and then 2.68 g of ethanol solvent was injected using a syringe. After that, the mixture was stirred and dissolved using a stirrer. Then, 7.34 g (0.0308 mol) of 3-mercaptopropyltriethoxysilane was injected using a syringe. Finally, 0.077 g (0.468 mmol) of azobisisobutyronitrile was added while flowing nitrogen, followed by nitrogen bubbling for 20 minutes. The flask was immersed in an oil bath, and the bath temperature was gradually raised to 70° C. to allow the reaction to take place. 6 hours after the temperature reached 70° C., the oil bath was removed from the flask which was left to stand until it reached room temperature (25° C.). Then, ethanol was distilled off under reduced pressure, and 12.55 g (yield 96%) of the target silane-modified VDMON (VDMON-SSi) was obtained. It was confirmed by measurement of $^1$H-NMR and $^{13}$C-NMR that the introduction rate of silane was 100% and the double bond in the norbornene ring had disappeared.

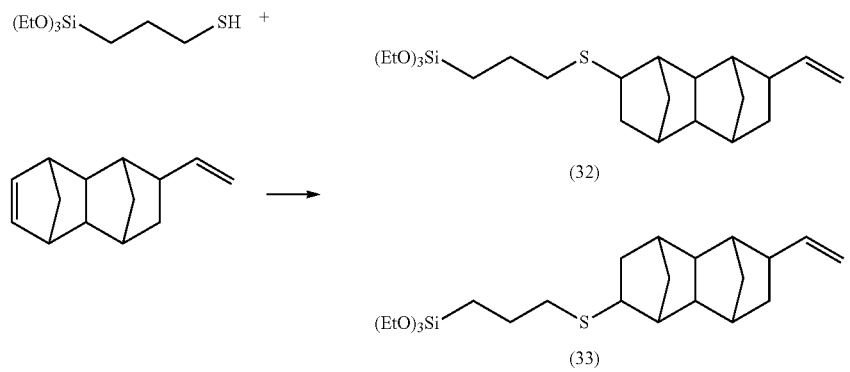

The obtained Silane Compound 4 is inferred to be a mixture of 16 stereoisomers represented by the following structural formulae:

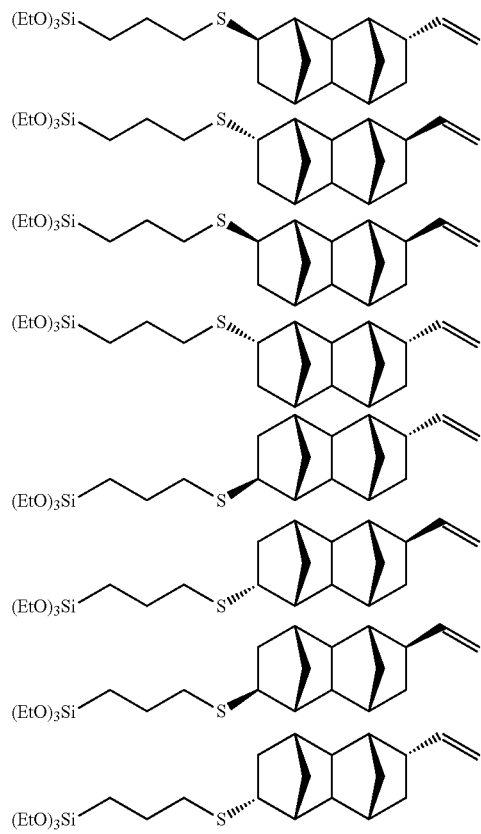

or formulae:

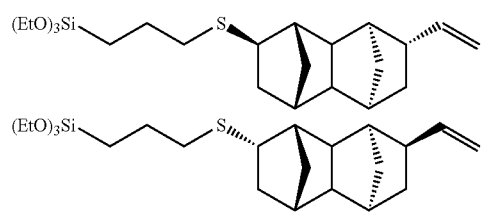

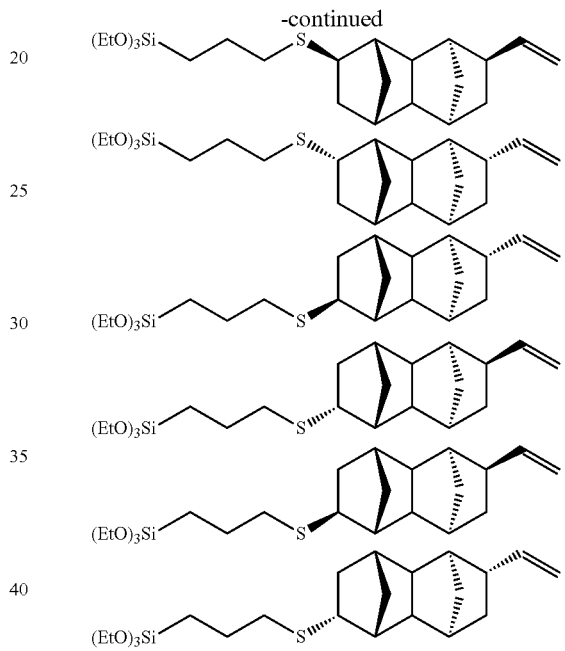

5. Preparation Example 5: Production of Silane Coupling Agent Composition 1

A 100-mL 3-neck flask was equipped with a ball stopper, a 3-way cock connected to a dry nitrogen line, a stirrer bar, a three one motor, and the system was substituted by flowing nitrogen from the nitrogen line to make ordinary pressure nitrogen atmosphere. To the flask was introduced 6.0 g of carbon black 1 (product name: Seast K H, manufactured by Tokai Carbon Co., Ltd.) and 3.0 g of urea, and the stirring blade was rotated at 60 rpm to mix. After 15 minutes from the start of stirring, 6.0 g of Silane Compound 1 (VNB-SSi) was added dropwise little by little using a dropper, and after the entire amount was added, the rotation speed of the stirring blade was raised to 200 rpm to further mix. After 1 hour, stirring was stopped, and 14.9 g of black granular solid (Silane Coupling Agent Composition 1) having a diameter of about 1 to 3 mm was obtained.

6. Preparation Example 6: Production of Silane Coupling Agent Composition 2

A Silane Coupling Agent Composition 2 was produced in the same manner as in Preparation Example 5 except that carbon black 1 was changed to carbon black 2 (manufactured by Tokai Carbon Co., Ltd., product name: Seast 7HM).

7. Example 1: Preparation and Evaluation of Rubber Composition and Rubber Sheet Containing Silane Compound 1, Urea and Natural Rubber (Part 1: Evaluation of Urea Addition Amount)

(1) Example 1-1

Preparation of Rubber Composition and Rubber Sheet

Each of the following components were kneaded using a 100 mL kneader (Laboplast Mill manufactured by Toyo Seiki Seisaku-sho Ltd.) to obtain a rubber composition. The details of the kneading operation carried out are as shown in (i) to (iii) below.
(i) Mixer kneading: Natural rubber was charged into a closed pressure kneader heated to 150° C. and subjected to mastication at 30 rpm for 1 minute, and then ½ of the amount measured of a mixture of silica, zinc oxide, stearic acid and an anti-aging agent, and the entire amount of a silane coupling agent (Silane Compound 1 (VNB-SSi)) and the entire amount of a Protein Modifying Agent 1 (urea) were charged, and the rotation speed was increased to 50 rpm and kneading was performed for 1 minute and 30 seconds. The remaining ½ of the amount measured of the mixture of silica, zinc oxide, stearic acid and an anti-aging agent was added, and the kneading was continued for 1 minute and 30 seconds, then ram (floating weight) was raised and the powder of the mixture of the silica, zinc oxide, stearic acid and anti-aging agent adhered to the surrounding was charged into the kneaded material using a brush, and after the kneading was continued for 1 minute, ram was raised again and the powder of the mixture of the silica, zinc oxide, stearic acid and anti-aging agent adhered to the surrounding was charged into the kneaded material using a brush, and the kneaded material was further kneaded for 3 minutes and discharged.
(ii) Remill: In order to improve the dispersion of silica, a kneaded product was discharged to a closed pressure kneader heated to 120° C., sufficiently cooled down, and was further kneaded at 50 rpm for 2 minutes and then discharged.
(iii) Roll-kneading (addition of vulcanization system): After the temperature was sufficiently lowered by discharging, sulfur, a vulcanization accelerator, and the like were added to the kneaded product by two rolls and kneaded to obtain a rubber composition.

Then, the resulting unvulcanized rubber composition was placed in a metal mold (150 mm×150 mm×2 mm) and heated and pressurized at 150° C. for 25 minutes to obtain a vulcanized rubber sheet having a thickness of 2 mm.

(2) Example 1-2

A rubber composition and a rubber sheet were obtained in the same manner as in Example 1-1 except that the amount of urea added was 1 part by mass.

(3) Example 1-3

A rubber composition and a rubber sheet were obtained in the same manner as in Example 1-1 except that the amount of urea added was 2 parts by mass.

(4) Example 1-4

A rubber composition and a rubber sheet were obtained in the same manner as in Example 1-1, except that 1 part by mass of urea was added during mastication. Here, in order to add urea during pre-kneading, the mixer kneading step (i) in Example 1-1 was changed as follows.
(i) Mixer kneading (urea added during pre-kneading): The entire amount of natural rubber and urea was added to a closed pressure kneader heated to 150° C., pre-kneading was performed at 30 rpm for 1 minute, and then ½ of the amount measured of a mixture of silica, zinc oxide, stearic acid, and an anti-aging agent, and the entire amount of a silane coupling agent (Silane Compound 1 (VNB-SSi)) were added thereto, the rotation speed was increased to 50 rpm, and kneading was performed for 1 minute and 30 seconds. The remaining ½ amount of the mixture of silica, zinc oxide, stearic acid and an anti-aging agent was added, and kneading was continued for 1 minute and 30 seconds, and then ram (floating weight) was raised, the powder of the mixture of silica, zinc oxide, stearic acid and an anti-aging agent adhered to the surrounding was introduced by a brush, and after the kneading was continued for 1 minute, ram was raised again, and the powder of the mixture of silica, zinc oxide, stearic acid and an anti-aging agent adhered to the surrounding was introduced by a brush or the like, and kneading was further continued for 3 minutes, and then discharged.

(5) Comparative Example 1-1

A rubber composition and a rubber sheet were obtained in the same manner as in Example 1-1 except that no urea was contained, no Silane Compound 1 (VNB-SSi) was contained, but 3.2 parts by mass of another silane compound (Si69) was added.

(6) Comparative Example 1-2

A rubber composition and a rubber sheet were obtained in the same manner as in Example 1-1 except that urea was not contained.

| | |
|---|---|
| Natural rubber (RSS #3, made in Thailand) | 100 parts by mass |
| Protein Modifying Agent 1 (product name: urea; manufactured by Wako Pure Chemical Corporation) | 0.5 parts by mass |
| Silane Compound 1 (VNB-SSi) (Preparation Example 1) | 3.2 parts by mass |
| Silica AQ (product name: Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Sulfur (5% oil-treated sulfur, manufactured by Hosoi Chemical Industry Co., Ltd.) | 2 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER D, manufactured by Ouchi Shinko Chemical Industrial Co., Ltd.) | 0.5 parts by mass |

(7) Comparative Example 1-3

A rubber composition and a rubber sheet were obtained in the same manner as in Example 1-1 except that the amount of urea added was 1 part by mass, no Silane Compound 1 (VNB-SSi) was added, and 3.2 parts by mass of another silane compound (Si69) was added.

(8) Comparative Example 1-4

A rubber composition and a rubber sheet were obtained in the same manner as in Example 1-1 except that 1 part by mass of urea was added during mastication, no Silane Compound 1 (VNB-SSi) was added, and 3.2 parts by mass of another silane compound (Si69) was added. In order to add urea during mastication, the mixer kneading step (i) in Example 1-1 was changed as described in Example 1-4 above.

(9) Physical Property Evaluation

The physical properties of the rubber compositions and rubber sheets obtained in Examples 1-1 to 1-4 and Comparative Examples 1-1 to 1-4 above were evaluated by the following methods.

(Viscosity)

Mooney viscosity of the rubber compositions obtained in Examples 1-1 to 1-4 and Comparative Examples 1-1 to 1-4 was measured according to JIS K6300 using an L-type rotor (38.1 mm in diameter and 5.5 mm in thickness) with a Mooney viscometer under conditions of a preheating time of 1 minute, a rotor rotation time of 4 minutes, and 100° C. at 2 rpm. The smaller the measurement result means the smaller the viscosity is and the better the workability is.

(Hardness)

Three rubber sheets (thickness: 2 mm) obtained in Examples 1-1 to 1-4 and Comparative Examples 1-1 to 1-4 were stacked and measured for JIS-A strength according to JIS K6353 (issued in 2012). The larger the measurement result means the higher the hardness of the rubber sheet is and the more excellent the steering stability as a tire is.

(Viscoelasticity)

Using a viscoelastic measuring device (REOGEL E-4000 manufactured by UBM Co., Ltd.), the rubber sheets obtained in Examples 1-1 to 1-4 and Comparative Examples 1-1 to 1-4 were determined for tan δ at measurement temperatures of 0° C. and 60° C. under conditions of deformation of about 0.1%, frequency of 10 Hz, in accordance with JIS K6394, and from the values, tan δ balance (=tan δ (0° C.)/tan δ (60° C.)) was calculated. The greater the tan δ balance means the better the viscoelastic properties of the rubber sheet is and the better the balance between wet grip properties and fuel consumption properties as a tire is.

(Tensile Strength)

No. 3 dumbbell-shaped test pieces were punched out from the rubber sheets obtained in Examples 1-1 to 1-4 and Comparative Examples 1-1 to 1-4, and a tensile test at a tensile speed of 500 mm/min in accordance with JIS K6251 (issued in 2010) was conducted, and 100% modulus [MPa] was measured at room temperature (25° C.). The larger the measurement result means the higher the tensile strength of the rubber sheet is and the better the performance as a tire is.

The above measurement results and calculation results (tan δ balance) are shown in Table 1. Each measured value and each calculated value is expressed by an index in which each value in Comparative Example 1-1 is set to 100.

TABLE 1

| | | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 |
|---|---|---|---|---|---|---|---|---|---|
| Composition of Rubber composition (parts by mass) | Natural Rubber (RSS#3) | 100 | 100 | 100 | 100 | 100 | 100 | 100 | 100 |
| | Silica AQ | 40 | 40 | 40 | 40 | 40 | 40 | 40 | 40 |
| | Zinc Oxide No. 3 | 3 | 3 | 3 | 3 | 3 | 3 | 3 | 3 |
| | Stearic acid | 1 | 1 | 1 | 1 | 1 | 1 | 1 | 1 |
| | Anti-aging agent (NOCRAC 6C) | 1 | 1 | 1 | 1 | 1 | 1 | 1 | 1 |
| | Silane Compound 1 (VNB-SSi) | 3.2 | 3.2 | 3.2 | 3.2 | 0 | 3.2 | 0 | 0 |
| | Another Silane Compound (Si69) | 0 | 0 | 0 | 0 | 3.2 | 0 | 3.2 | 3.2 |
| | Protein-modifying agent 1 (urea) | 0.5 | 1 | 2 | 19 | 0 | 0 | 1 | 19 |
| | Sulfur (5% oil treated) | 2 | 2 | 2 | 2 | 2 | 2 | 2 | 2 |
| | Vulcanization accelerator (NOCCELER CZ) | 1 | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 | 0.5 |
| Viscosity | ML1 + 4 100° C. (index) | 75 | 71 | 74 | 75 | 100 | 113 | 92 | 114 |
| Hardness | JIS-A Hardness | 109 | 108 | 112 | 112 | 100 | 104 | 102 | 107 |
| Viscoelasticity | tanδ(0° C.) (index) | 92 | 91 | 93 | 93 | 100 | 91 | 97 | 97 |
| | tanδ(60° C.) (index) | 77 | 71 | 68 | 73 | 100 | 93 | 82 | 85 |
| | tanδ(0° C.)/ tanδ(60° C.) (index) | 119 | 128 | 137 | 128 | 100 | 98 | 118 | 114 |

TABLE 1-continued

|  |  | Ex. 1-1 | Ex. 1-2 | Ex. 1-3 | Ex. 1-4 | Comp. Ex. 1-1 | Comp. Ex. 1-2 | Comp. Ex. 1-3 | Comp. Ex. 1-4 |
|---|---|---|---|---|---|---|---|---|---|
| Tensile strength | 100% Modulus (index) | 113 | 115 | 131 | 126 | 100 | 98 | 106 | 124 |

Note:
In Examples 1-4 and Comparative Examples 1-4, urea was added during the pre-kneading.

The results of Examples 1-1 to 1-3 show lower viscosity, better tan δ balance and higher tensile strength (100% modulus) than those of Comparative Example 1-2 in which urea was not added. The results of Examples 1-1 to 1-3 show lower viscosity, better tan δ balance and higher tensile strength (100% modulus) than those of Comparative Example 1-3 in which urea was added and another silane compound was contained. The results of Example 1-4 in which urea was added at the time of mastication shows lower viscosity, better tan δ balance and higher tensile strength (100% modulus) than those of Comparative Example 1-4 in which urea was added at the time of mastication and another silane compound was contained. In addition, in Examples 1-1 to 1-3, it was seen that the tan δ balance and the tensile strength (100% modulus) increased as the amount of urea added increased. Therefore, it has been found that the rubber compositions of the present invention can be used to produce tires having excellent balance between wet grip and low fuel consumption in practical use.

8. Example 2: Preparation and Evaluation of Rubber Composition and Rubber Sheet Containing Silane Compound 1, Protein Modifying Agent and Natural Rubber (Part 2: Evaluation of Various Protein Modifying Agents)

(1) Example 2-1

Preparation of Rubber Composition and Rubber Sheet

Each of the following components was kneaded using a 100 mL kneader (Laboplast mill manufactured by Toyo Seiki Co., Ltd.) in the same manner as in Example 1-1 to obtain a rubber composition. Then, the rubber composition was placed in a mold (150 mm×150 mm×2 mm) and heated and pressurized at 150° C. for 25 minutes to obtain a rubber sheet having a thickness of 2 mm.

(2) Example 2-2

A rubber composition and a rubber sheet were obtained in the same manner as in Example 2-1, except that addition of 2 parts by mass of a 50% aqueous solution of glutaraldehyde was changed to addition of 1 part by mass of Protein Modifying Agent 3 (dimethyl suberimidate dihydrochloride (Tokyo Chemical Industry Co., Ltd.)).

(3) Example 2-3

A rubber composition and a rubber sheet were obtained in the same manner as in Example 2-1 except that addition of 2 parts by mass of a 50% aqueous solution of glutaraldehyde was changed to addition of 1 part by mass of a Protein Modifying Agent 4 (sodium dodecyl sulfate (Tokyo Chemical Industry Co., Ltd.)).

(4) Example 2-4

A rubber composition and a rubber sheet were obtained in the same manner as in Example 2-1 except that addition of 2 parts by mass of a 50% aqueous solution of glutaraldehyde was changed to addition of 1 part by mass of a Protein Modifying Agent 5 (guanidine hydrochloride (Tokyo Chemical Industry Co., Ltd.)).

(5) Comparative Example 2-1

A rubber composition and a rubber sheet were obtained in the same manner as in Example 2-1 except that no Silane Compound 1 (VNB-SSi) was added, 3.2 parts by mass of another silane compound (Si69) (manufactured by Degussa.) was added, and the amount of sulfur added was 2.00 parts by mass.

(6) Comparative Example 2-2

A rubber composition and a rubber sheet were obtained in the same manner as in Example 2-2 except that the silane compound 1 (VNB-SSi) was not contained, 3.2 parts by

| | |
|---|---|
| Natural rubber (RSS #3, made in NZ) | 100 parts by mass |
| Protein Modifying Agent 2 (product name: 50% aqueous solution of glutaraldehyde; manufactured by Tokyo Chemical Industry Co., Ltd.) | 2 parts by mass |
| Silane Compound 1 (VNB-SSi) (Preparation Example 1) | 3.2 parts by mass |
| Silica AQ (product name: Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Sulfur (5% oil-treated sulfur, manufactured by Hosoi Chemical Industry Co., Ltd.) | 2.76 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER D, manufactured by Ouchi Shinko Chemical Industrial Co., Ltd.) | 0.5 parts by mass | mass of another silane compound (Si69) (manufactured by Degussa) was added, and the amount of sulfur added was 2.00 parts by mass.

(7) Comparative Example 2-3

A rubber composition and a rubber sheet were obtained in the same manner as in Example 2-3 except that no Silane Compound 1 (VNB-SSi) was contained, 3.2 parts by mass of another silane compound (Si69) (manufactured by Degussa) was added, and the amount of sulfur added was 2.00 parts by mass.

(8) Comparative Example 2-4

A rubber composition and a rubber sheet were obtained in the same manner as in Example 2-4, except that no Silane Compound 1 (VNB-SSi) was contained, 3.2 parts by mass of another silane compound (Si69) (manufactured by Degussa) was added, and the amount of sulfur added was 2.00 parts by mass.

(9) Comparative Example 2-5

A rubber composition and a rubber sheet were obtained in the same manner as in Example 2-1, except that no Silane Compound 1 (VNB-SSi) was contained, 3.2 parts by mass of another silane compound (Si69) (manufactured by Degussa) was added, the amount of sulfur was set to 2.00 parts by mass, and no 50% aqueous solution of glutaraldehyde was contained.

(10) Physical Property Evaluation

Physical properties of the rubber compositions and the rubber sheets obtained in Examples 2-1 to 2-4 and Comparative Examples 2-1 to 2-5 were evaluated by the method described in Example 1 (9) Physical Property Evaluation as above.

The above measurement results and calculation results (tan δ balance) are shown in Table 2. Each measured value and each calculated value are shown as a relative value when each value in Comparative Example 2-5 is set to 100.

TABLE 2

| | | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 | Comp. Ex. 2-5 |
|---|---|---|---|---|---|---|---|---|---|---|
| Composition of Rubber composition (parts by mass) | Natural Rubber (RSS#3) | 100 | 100 | 100 | 100 | 100 | 100 | 100 | 100 | 100 |
| | Silica AQ | 40 | 40 | 40 | 40 | 40 | 40 | 40 | 40 | 40 |
| | Zinc Oxide No. 3 | 3 | 3 | 3 | 3 | 3 | 3 | 3 | 3 | 3 |
| | Stearic acid | 1 | 1 | 1 | 1 | 1 | 1 | 1 | 1 | 1 |
| | Anti-aging agent (NOCRAC 6C) | 1 | 1 | 1 | 1 | 1 | 1 | 1 | 1 | 1 |
| | Silane Compound 1 (VNB-SSi) | 3.2 | 3.2 | 3.2 | 3.2 | 0 | 0 | 0 | 0 | 0 |
| | Another Silane Compound (Si69) | 0 | 0 | 0 | 0 | 3.2 | 3.2 | 3.2 | 3.2 | 3.2 |
| | Protein modifying agent 2 (50% aqueous solution of glutaraldehyde) | 2 | 0 | 0 | 0 | 2 | 0 | 0 | 0 | 0 |
| | Protein modifying agent 3 (dimethyl suberimidate dihydrochloride) | 0 | 1 | 0 | 0 | 0 | 1 | 0 | 0 | 0 |
| | Protein modifying agent 4 (sodium dodecyl sulfate) | 0 | 0 | 1 | 0 | 0 | 0 | 1 | 0 | 0 |
| | Protein modifying agent 5 (guanidine hydrochloride) | 0 | 0 | 0 | 1 | 0 | 0 | 0 | 1 | 0 |
| | Sulfur (5% oil treated) | 2.76 | 2.76 | 2.76 | 2.76 | 2 | 2 | 2 | 2 | 2 |
| | Vulcanization accelerator (NOCCELER CZ) | 1 | 1 | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 | 0.5 | 0.5 |
| Viscosity | ML1 + 4 100° C. (index) | 92 | 97 | 87 | 92 | 101 | 102 | 93 | 95 | 100 |
| Hardness | JIS-A Hardness | 103 | 108 | 103 | 105 | 105 | 105 | 98 | 105 | 100 |
| Viscoelasticity | tanδ(0° C.) (index) | 99 | 96 | 101 | 97 | 97 | 98 | 100 | 97 | 100 |
| | tanδ(60° C.) (index) | 96 | 93 | 100 | 92 | 104 | 99 | 112 | 97 | 100 |
| | tanδ(0° C.)/ tanδ(60° C.) (index) | 103 | 103 | 101 | 106 | 93 | 99 | 89 | 100 | 100 |

TABLE 2-continued

|  |  | Ex. 2-1 | Ex. 2-2 | Ex. 2-3 | Ex. 2-4 | Comp. Ex. 2-1 | Comp. Ex. 2-2 | Comp. Ex. 2-3 | Comp. Ex. 2-4 | Comp. Ex. 2-5 |
|---|---|---|---|---|---|---|---|---|---|---|
| Tensile strength | 100% Modulus (index) | 111 | 112 | 109 | 109 | 107 | 107 | 89 | 102 | 100 |

Examples 2-1 to 2-4 show improvement in tan δ balance and increase in tensile strength (100%/Modulus). Therefore, it has been found that tires having excellent balance between wet grip and low fuel consumption can be produced in practice by using the rubber compositions of the present invention. Further, it has been found that similar effects can be obtained by using glutaraldehyde, dimethyl suberimidate dihydrochloride, sodium dodecyl sulfate, or guanidine hydrochloride as the protein modifying agents instead of urea used in Example 1.

9. Example 3: Preparation and Evaluation of Rubber Composition and Rubber Sheet Containing Silane Compound, Urea and Natural Rubber (Part 3: Evaluation of Various Silane Compound)

(1) Example 3-1

Preparation of Rubber Composition and Rubber Sheet

Each of the following components was kneaded using a 100 mL kneader (Laboplast mill manufactured by Toyo Seiki Co., Ltd.) in the same manner as in Example 1-1 to obtain a rubber composition. Then, the rubber composition was placed in a mold (150 mm×150 mm×2 mm) and heated and pressurized at 150° C. for 25 minutes to obtain a rubber sheet having a thickness of 2 mm.

| | |
|---|---|
| Natural rubber (RSS #3, made in NZ) | 100 parts by mass |
| Protein Modifying Agent 1 (product name: urea; manufactured by Wako Pure Chemical Corporation) | 0.5 parts by mass |
| Silane Compound 1 (VNB-SSi) (Preparation Example 1) | 3.2 part by mass |
| Silica AQ (product name: Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Sulfur (5% oil-treated sulfur, manufactured by Hosoi Chemical Industry Co., Ltd.) | 2.00 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER D, manufactured by Ouchi Shinko Chemical Industrial Co., Ltd.) | 0.5 parts by mass |

(2) Example 3-2

A rubber composition and a rubber sheet were obtained in the same manner as in Example 3-1, except that addition of 3.2 parts by mass of Silane Compound 1 (VNB-SSi) was changed to addition 3.2 parts by mass of Silane Compound 2 (DCPD-SSi) (Preparation Example 2).

(3) Example 3-3

A rubber composition and a rubber sheet were obtained in the same manner as in Example 3-1 except that addition of 3.2 parts by mass of Silane Compound 1 (VNB-SSi) was changed to addition of 3.2 parts by mass of Silane Compound 3 (ENB-SSi) (Preparation Example 3).

(4) Example 3-4

A rubber composition and a rubber sheet were obtained in the same manner as in Example 3-1 except that addition of 3.2 parts by mass of Silane Compound 1 (VNB-SSi) was changed to addition of 1.6 parts by mass of Silane Compound 1 and 1.6 parts by mass of another silane compound (Si69) (manufactured by Degussa).

(5) Example 3-5

A rubber composition and a rubber sheet were obtained in the same manner as in Example 3-1 except that addition of 3.2 parts by mass of Silane Compound 1 (VNB-SSi) was changed to addition of 3.2 parts by weight of Silane Compound 4 (VDMON-SSi) (manufactured by Degussa) and no vulcanization accelerator (NOCCELER D, manufactured by Ouchi Shinko Chemical Industrial Co., Ltd.) was added.

(6) Comparative Example 3-1

A rubber composition and a rubber sheet were obtained in the same manner as in Example 3-1 except that no Silane Compound 1 (VNB-SSi) was contained and 3.2 parts by mass of another silane compound (Si69) (manufactured by Degussa) was added.

(7) Comparative Example 3-2

A rubber composition and a rubber sheet were obtained in the same manner as in Example 3-1 except that no Silane compound 1 (VNB-SSi) was contained, 3.2 parts by mass of another silane compound (Si69) (manufactured by Degussa) was added, and no sulfur was contained.

(8) Physical Property Evaluation

Physical properties of the rubber compositions and the rubber sheets obtained in Examples 3-1 to 3-5 and Comparative Examples 3-1 to 3-2 above were evaluated by the method described in Example 1 (9) Physical Property Evaluation as above.

The above measurement results and calculation results (tan balance) are shown in Table 3. Each measured value and each calculated value are shown as relative values when each value in Comparative Example 3-2 is set to 100.

TABLE 3

| | | Ex. 3-1 | Ex. 3-2 | Ex. 3-3 | Ex. 3-4 | Ex. 3-5 | Comp. Ex. 3-1 | Comp. Ex. 3-2 |
|---|---|---|---|---|---|---|---|---|
| Composition of Rubber composition (parts by mass) | Natural Rubber (RSS#3) | 100 | 100 | 100 | 100 | 100 | 100 | 100 |
| | Silica AQ | 40 | 40 | 40 | 40 | 40 | 40 | 40 |
| | Zinc Oxide No. 3 | 3 | 3 | 3 | 3 | 3 | 3 | 3 |
| | Stearic acid | 1 | 1 | 1 | 1 | 1 | 1 | 1 |
| | Anti-aging agent (NOCRAC 6C) | 1 | 1 | 1 | 1 | 1 | 1 | 1 |
| | Silane Compound 1 (VNB-SSi) | 3.2 | 0 | 0 | 1.6 | 0 | 0 | 0 |
| | Silane Compound 2 (DCPD-SSi) | 0 | 3.2 | 0 | 0 | 0 | 0 | 0 |
| | Silane Compound 3 (ENB-SSi) | 0 | 0 | 3.2 | 0 | 0 | 0 | 0 |
| | Silane Compound 4 (VDMON-SSi) | 0 | 0 | 0 | 0 | 3.2 | 0 | 0 |
| | Another Silane Compound (Si69) | 0 | 0 | 0 | 1.6 | 0 | 3.2 | 3.2 |
| | Protein-modifying agent 1 (urea) | 1 | 1 | 1 | 1 | 1 | 1 | 0 |
| | Sulfur (5% oil treated) | 2 | 2 | 2 | 2 | 2 | 2 | 2 |
| | Vulcanization accelerator (NOCCELER CZ) | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 |
| Viscosity | ML1 + 4 100° C. (index) | 84.9 | 82.4 | 84.7 | 85.8 | 80 | 96.8 | 100 |
| Hardness | JIS-A Hardness | 108.5 | 103.4 | 105.1 | 106.8 | 110 | 101.7 | 100 |
| Viscoelasticity | tanδ(0° C.) (index) | 91.1 | 93.8 | 93.4 | 94.4 | 96 | 99.8 | 100 |
| | tanδ(60° C.) (index) | 75 | 66.1 | 71.6 | 72.3 | 63 | 84.5 | 100 |
| | tanδ(0° C.)/ tanδ(60° C.) (index) | 121.5 | 142 | 130.6 | 130.6 | 152.4 | 118.1 | 100 |
| Tensile strength | 100% Modulus (index) | 113.7 | 96.6 | 103.4 | 105.5 | 106 | 110.7 | 100 |

Examples 3-1 to 3-5 show improvement in tan δ balance and increase in tensile strength (100% modulus). Therefore, it has been found that tires having an excellent balance between wet grip and low fuel consumption can be produced in practice by using the rubber compositions of the present invention. Further, it has been found that similar effects can be obtained by using Silane Compound 2, Silane Compound 3, a mixture of Silane Compound 1 and another silane compound, or a mixture of Silane Compound 1 and Silane Compound 4 as the silane compound instead of Silane Compound 1 alone used in Example 1.

10. Example 4: Preparation and Evaluation of Rubber Composition and Rubber Sheet Containing Silane Compound 1, Protein Modifying Agent (Urea and Diphenylguanidine), and Natural Rubber (Part 4: Evaluation of Various Silane Compounds)

(1) Example 4-1

Preparation of Rubber Composition and Rubber Sheet

Each of the following components was kneaded using a 100 mL kneader (Laboplast mill manufactured by Toyo Seiki Co., Ltd.) in the same manner as in Example 1-1 to obtain a rubber composition. Then, the rubber composition was placed in a mold (150 mm×150 mm×2 mm) and heated and pressurized at 160° C. for 30 minutes to obtain a rubber sheet having a thickness of 2 mm.

| | |
|---|---|
| Natural rubber (RSS #3, made in NZ) | 100 parts by mass |
| Silica AQ (product name: Nip Seal AQ; manufactured by Tosoh Corporation) | 40 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Protein Modifying Agent 1 (product name: urea; manufactured by Wako Pure Chemical Corporation) | 0.5 parts by mass |
| Protein Modifying Agent 2 (product name: NOCCELER D, diphenyl guanidine (DPG), manufactured by Ouchi Shinko Chemical Industrial Co., Ltd.) | 1 part by mass |
| Silane Compound 1 (VNB-SSi) (Preparation Example 1) | 3.2 part by mass |
| Sulfur (5% oil-treated sulfur, manufactured by Hosoi Chemical Industry Co., Ltd.) | 2.76 parts by mass |
| Vulcanization accelerator (product name: NOCCELER CZ, manufactured by Ouchi Shinko Chemical Industrial Co., Ltd.) | 1 part by mass |

| Vulcanization accelerator (product name: NOCCELER D, manufactured by Ouchi Shinko Chemical Industrial Co., Ltd.) | 0.5 parts by mass |
|---|---|

(2) Example 4-2

A rubber composition and a rubber sheet were obtained in the same manner as in Example 4-1, except that the content of Protein Modifying Agent 2 (DPG) was changed to 0.0.5 parts by mass.

(3) Comparative Example 4-1

A rubber composition and a rubber sheet were obtained in the same manner as in Example 4-1, except that no Silane Compound 1 (VNB-SSi) was contained, 3.2 parts by mass of another silane compound (Si69) (manufactured by Degussa) was added, further no urea and diphenylguanidine were contained, and the content of sulfur was changed to 2.00 parts by mass.

(4) Comparative Example 4-2

A rubber composition and a rubber sheet were obtained in the same manner as in Example 4-1, except that no Silane Compound 1 (VNB-SSi) was contained, 3.2 parts by mass of another silane compound (Si69) (manufactured by Degussa) was added, further no diphenylguanidine was contained, and the content of sulfur was changed to 2.00 parts by mass.

(5) Comparative Example 4-3

A rubber composition and a rubber sheet were obtained in the same manner as in Example 4-1, except that no Silane Compound 1 (VNB-SSi) was contained, 3.2 parts by mass of another silane compound (Si69) (manufactured by Degussa) was added, and the content of sulfur was changed to 2.00 parts by mass.

(6) Example 4-3

A rubber composition and a rubber sheet were obtained in the same manner as in Example 4-1 except that the following components were used.

(7) Comparative Example 4-4

A rubber composition and a rubber sheet were obtained in the same manner as in Example 4-3 except that no Silane Compound 1 (VNB-SSi) was contained, 4.0 parts by mass of another silane compound (Si69) (manufactured by Degussa) was added, further no urea and diphenylguanidine were contained, and the content of sulfur was changed to 2.00 parts by mass.

(8) Comparative Example 4-5

A rubber composition and a rubber sheet were obtained in the same manner as in Example 4-3 except that no Silane Compound 1 (VNB-SSi) was contained, 4.0 parts by mass of another silane compound (Si69) (manufactured by Degussa) was added, further no diphenylguanidine was contained, and the content of sulfur was changed to 2.00 parts by mass.

(9) Physical Property Evaluation

Physical properties of the rubber compositions and the rubber sheets obtained in Examples 4-1 to 4-3 and Comparative Examples 4-1 to 4-5 were evaluated by the method described in Example 1 (9) Physical Property Evaluation as above.

(Scorch Resistance)

In accordance with JIS K6300, an unvulcanized rubber composition was preheated at 125° C. for 1 minute using a rotor-less Mooney tester manufactured by Toyo Seiki Co., Ltd. in accordance with JIS K, and subsequently, time t5 required to increase by 5 mooney units above the minimum viscosity Vm was measured. The larger the measurement result means the longer the scorch time is and the more excellent the workability of the rubber composition is.

The above measurement results and calculation results (tan δ balance) are shown in Table 4. Each measurement value and each calculation value in Example 4-1, Example 4-2, Comparative Example 4-2, and Comparative Example 4-3 are described as relative values when each value in Comparative Example 4-1 is set to 100. Each measurement value and each calculation value in Example 4-3 and Comparative Example 4-5 are described as relative values when each value in Comparative Example 4-4 is set to 100.

| | |
|---|---|
| Natural rubber (RSS #3, made in NZ) | 100 parts by mass |
| Silica AQ (product name: Nip Seal AQ; manufactured by Tosoh Corporation) | 50 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Protein Modifying Agent 1 (product name: urea; manufactured by Wako Pure Chemical Corporation) | 1.25 parts by mass |
| Protein Modifying Agent 2 (product name: NOCCELER D, diphenyl guanidine (DPG), manufactured by Ouchi Shinko Chemical Industrial Co., Ltd.) | 1 part by mass |
| Silane Compound 1 (VNB-SSi) (Preparation Example 1) | 4.0 parts by mass |
| Sulfur (5% oil-treated sulfur, manufactured by Hosoi Chemical Industry Co., Ltd.) | 2.95 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER D, manufactured by Ouchi Shinko Chemical Industrial Co., Ltd.) | 0.5 parts by mass |

TABLE 4

|  |  | Ex. 4-1 | Ex. 4-2 | Comp. Ex. 4-1 | Comp. Ex. 4-2 | Comp. Ex. 4-3 | Ex. 4-3 | Comp. Ex. 4-4 | Comp. Ex. 4-5 |
|---|---|---|---|---|---|---|---|---|---|
| Composition of Rubber composition (parts by mass) | Natural Rubber (RSS#3) | 100 | 100 | 100 | 100 | 100 | 100 | 100 | 100 |
| | Silica AQ | 40 | 40 | 40 | 40 | 40 | 50 | 50 | 50 |
| | Zinc Oxide No. 3 | 3 | 3 | 3 | 3 | 3 | 3 | 3 | 3 |
| | Stearic acid | 1 | 1 | 1 | 1 | 1 | 1 | 1 | 1 |
| | Anti-aging agent (NOCRAC 6C) | 1 | 1 | 1 | 1 | 1 | 1 | 1 | 1 |
| | Silane Compound 1 (VNB-SSi) | 3.2 | 3.2 | 0 | 0 | 0 | 4 | 0 | 0 |
| | Another Silane Compound (Si69) | 0 | 0 | 3.2 | 3.2 | 3.2 | 0 | 4 | 4 |
| | Protein-modifying agent 1 (urea) | 1 | 1 | 0 | 1 | 1 | 1.25 | 0 | 1.25 |
| | Protein-modifying agent 2 (DPG) | 1 | 0.05 | 0 | 0 | 1 | 1 | 0 | 0 |
| | Sulfur (5% oil treated) | 2.76 | 2.76 | 2 | 2 | 2 | 2.95 | 2 | 2 |
| | Vulcanization accelerator (NOCCELER CZ) | 1 | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 | 0.5 |
| Viscosity | ML1 + 4 100° C. (index) | 85 | 92 | 100 | 112 | 112 | 66 | 100 | 98 |
| Viscoelasticity | tanδ(0° C.) (index) | 88 | 93 | 100 | 96 | 89 | 91 | 100 | 99 |
| | tanδ(60° C.) (index) | 62 | 71 | 100 | 85 | 61 | 46 | 100 | 61 |
| | tanδ(0° C.)/tanδ(60° C.) (index) | 143 | 131 | 100 | 112 | 146 | 199 | 100 | 161 |
| Scorch Resistance | T5 125° C. (index) | 103 | 144 | 100 | 72 | 56 | 186 | 100 | 95 |

From the results of Examples 4-1 to 4-3 and Comparative Examples 4-1 to 4-5, a rubber composition containing a silane coupling agent (Silane Compound 1), a protein modifying agent (urea and diphenylguanidine) and natural rubber shows decrease in viscosity and improvement in scorch resistance, and further shows improvement in viscoelasticity of a rubber sheet. Therefore, it has been found that the use of the rubber compositions of the present invention can improve the processability of rubber and can produce tires having excellent balance between wet grip and low fuel consumption in practical use.

11. Example 5: Preparation and Evaluation of Rubber Composition and Rubber Sheet Containing Silane Compound 1, Protein Modifying Agent, Carbon Black, and Natural Rubber (1) Example 5-1

Preparation of Rubber Composition and Rubber Sheet

Each of the following components were kneaded using a 100 mL kneader (Laboplast Mill manufactured by Toyo Seiki Co., Ltd.) to obtain a rubber composition. The details of the kneading operation are as shown in (i) to (iii) below.
(i) Mixer kneading: natural rubber was charged into a closed pressure kneader heated to 150° C., and after mastication was carried out at 30 rpm for 1 minute, ½ of the amount measured of a mixture of silica, carbon black, zinc oxide, stearic acid, and an anti-aging agent, and the entire amount of a silane coupling agent (Silane Compound 1 (VNB-SSi)) and the entire amount of Protein Modifying Agent 1 (urea) were charged, and rotation speed was increased to 50 rpm, and kneading was carried out for 1 minute and 30 seconds. Further, the remaining ½ of the mixture of the silica, carbon black, zinc oxide, stearic acid, and an anti-aging agent was added, and kneading was continued for 1 minute and 30 seconds, then ram (floating weight) was raised and the powder of the mixture of silica, zinc oxide, stearic acid and an anti-aging agent adhered to the surrounding was charged into the kneaded material by using a brush, and kneading was continued for 1 minute, then ram was raised again and the powder of the mixture of silica, carbon black, zinc oxide, stearic acid and an anti-aging agent adhered to the surrounding was charged into the kneaded material by using a brush, and the kneaded material was further kneaded for 3 minutes and discharged.
(ii) Remill: In order to improve the dispersion of silica, a kneaded product was discharged to a closed pressure kneader heated to 120° C. and sufficiently cooled down, then was further kneaded at 50 rpm for 2 minutes and discharged.
(iii) Roll-kneading (addition of vulcanization system): After the temperature was sufficiently lowered by discharging, sulfur, a vulcanization accelerator and the like were added to the kneaded product by two rolls and kneaded to obtain a rubber composition.

Then, the obtained rubber composition was placed in a mold (150 mm×150 mm×2 mm) and heated and pressurized at 160° C. for 30 minutes to obtain a rubber sheet having a thickness of 2 mm.

| | |
|---|---|
| Natural rubber (RSS #3, made in NZ) | 100 parts by mass |
| Silica AQ (product name: Nip Seal AQ; manufactured by Tosoh Corporation) | 40 parts by mass |
| Carbon Black 1 (product name: Seast KH, manufactured by Tokai Carbon Co., Ltd.) | 3.2 parts by mass |
| Zinc Oxide No. 3 (product name: Ginrei R, manufactured by Toho Zinc Co., Ltd.) | 3 parts by mass |
| Stearic Acid (product name: Stearic acid 300; manufactured by New Japan Chemical Co., Ltd.) | 1 part by mass |
| Anti-aging agent (manufactured by Ouchi Shinko Chemical Industrial Co., Ltd., NOCRAC 6 C) | 1 part by mass |
| Protein Modifying Agent 1 (product name: urea; manufactured by Wako Pure Chemical Corporation) | 1 part by mass |
| Silane Compound 1 (VNB-SSi) (Preparation Example 1) | 3.2 parts by mass |
| Sulfur (5% oil-treated sulfur, manufactured by Hosoi Chemical Industry Co., Ltd.) | 2.76 parts by mass |
| Vulcanization accelerator (product name: NOCCELER CZ, manufactured by Ouchi Shinko Chemical Industrial Co., Ltd.) | 1 part by mass |
| Vulcanization accelerator (product name: NOCCELER. D, manufactured by Ouchi Shinko Chemical Industrial Co., Ltd.) | 0.5 parts by mass |

(2) Example 5-2

A rubber composition and a rubber sheet were obtained in the same manner as in Example 5-1 except that operation of the mixer kneading in Example 5-1 (i) was changed as follows.

(i) Mixer kneading: Natural rubber was charged into a closed pressure kneader heated at 150° C. and masticated at 30 rpm for 1 minute, and then ½ of the amount measured of a mixture of silica, zinc oxide, stearic acid, and an anti-aging agent and the entire amount of the Silane Coupling Agent Composition 1 (7.4 parts by mass, Preparation Example 5) were charged, the rotation speed was raised to 50 rpm, and kneading was performed for 1 minute and 30 seconds. Kneading was carried out at 50 rpm for 1 minute and 30 seconds. The remaining ½ of the amount of the mixture of silica, zinc oxide, stearic acid and an anti-aging agent was added, and kneading was continued for 1 minute and 30 seconds, and subsequently ram (floating weight) was raised and the powder of the mixture of silica, zinc oxide, stearic acid and an anti-aging agent adhered to the surrounding was charged into the kneaded material by using a brush, further after kneading was continued for 1 minute, the powder of the mixture of the silica, zinc oxide, stearic acid and an anti-aging agent adhered to the surrounding was charged into the kneaded material by using a brush, and kneading was continued for 3 minutes and discharged.

(3) Comparative Example 5-1

A rubber composition and a rubber sheet were obtained in the same manner as in Example 5-1 except that Silane Compound 1 (VNB-SSi) and urea were not contained, 3.2 parts by mass of another silane compound (Si69) (manufactured by Degussa) were added, and the content of sulfur was further changed to 2.00 parts by mass.

(4) Comparative Example 5-2

A rubber composition and a rubber sheet were obtained in the same manner as in Example 5-1 except that no Silane Compound 1 (VNB-SSi) was contained, 3.2 parts by mass of another silane compound (Si69) (manufactured by Degussa) was added, and the content of sulfur was further changed to 2.00 parts by mass.

(5) Example 5-3

A rubber composition and a rubber sheet were obtained in the same manner as in Example 5-1 except that the content of silica was changed to 50 parts by mass, 3.2 parts by mass of carbon black 1 was changed to 4.0 parts by mass of carbon black 2 (trade name: Seast 7HM, manufactured by Tokai Carbon Co., Ltd.), the content of urea was changed to 1.25 parts by mass, the content of Silane Compound 1 was changed to 4.0 parts by mass, and the content of sulfur was changed to 2.95 parts by mass.

(6) Example 5-4

A rubber composition and a rubber sheet were obtained in the same manner as in Example 5-2 except that the content of silica was changed to 50 parts by mass, 7.4 parts by mass of Silane Coupling Agent Composition 1 was changed to 9.25 parts by mass of Silane Coupling Agent Composition 2 (Preparation Example 6), and the content of sulfur was further changed to 2.95 parts by mass.

(7) Comparative Example 5-3

A rubber composition and a rubber sheet were obtained in the same manner as in Example 5-3 except that no Silane compound 1 (VNB-SSi) was contained, 4.0 parts by mass of another silane compound (Si69) (manufactured by Degussa) was added, and the content of sulfur was further changed to 2.00 parts by mass.

(8) Example 5-5

A rubber composition and a rubber sheet were obtained in the same manner as in Example 5-1 except that the content of silica was changed to 37.5 parts by mass, 3.2 parts by mass of carbon black 1 was changed to 12.5 parts by mass of carbon black 2, the content of urea was changed to 0.94 parts by mass, the content of Silane Compound 1 was changed to 3.0 parts by mass, and the content of sulfur was further changed to 2.71 part by mass.

(9) Comparative Example 5-4

A rubber composition and a rubber sheet were obtained in the same manner as in Example 5-5 except that urea and Silane Compound 1 (VNB-SSi) were not contained, 3.0 parts by mass of another silane compound (Si69) (manufactured by Degussa) was added, and the content of sulfur was further changed to 2.00 parts by mass.

(10) Comparative Example 5-5

A rubber composition and a rubber sheet were obtained in the same manner as in Example 5-5, except that Silane Compound 1 (VNB-SSi) was not contained, 3.0 parts by mass of another silane compound (Si69) (manufactured by Degussa) was added, and the content of sulfur was further changed to 2.00 parts by mass.

(11) Physical Property Evaluation

Physical properties of the rubber composition and the rubber sheet obtained in Examples 5-1 to 5-5 and Comparative Examples 5-1 to 5-5 above were evaluated by the methods described in Example 1 (9) Physical Property Evaluation and Example 4 (8) Physical Property Evaluation as above.

The above measurement results and calculation results (tan δ balance) are shown in Table 5. Each measured value and each calculated value in Examples 5-1, 5-2, and Comparative Example 5-2 are described as relative values when each value in Comparative Example 5-1 is set to 100. Each measured value and each calculated value in Example 5-3, 5-4 are described as relative values when each value in Comparative Example 5-3 is set to 100. Each measured value and each calculated value in Example 5-5 and Comparative Example 5-5 are described as relative values when each value in Comparative Example 5-4 is set to 100.

TABLE 5

| | | Ex. 5-1 | Ex. 5-2 | Comp. Ex. 5-1 | Comp. Ex. 5-2 | Ex. 5-3 | Ex. 5-4 | Comp. Ex. 5-3 | Ex. 5-5 | Comp. Ex. 5-4 | Comp. Ex. 5-5 |
|---|---|---|---|---|---|---|---|---|---|---|---|
| Composition of Rubber composition (parts by mass) | Natural Rubber (RSS#3) | 100 | 100 | 100 | 100 | 100 | 100 | 100 | 100 | 100 | 100 |
| | Silica AQ | 40 | 40 | 40 | 40 | 50 | 50 | 50 | 37.5 | 37.5 | 37.5 |
| | Carbon Black 1(Seast KH) | 3.2 | 0 | 3.2 | 3.2 | 0 | 0 | 0 | 0 | 0 | 0 |
| | Carbon Black 2(Seast 7HM) | 0 | 0 | 0 | 0 | 4 | 0 | 4 | 12.5 | 12.5 | 12.5 |
| | Zinc Oxide No. 3 | 3 | 3 | 3 | 3 | 3 | 3 | 3 | 3 | 3 | 3 |
| | Stearic acid | 1 | 1 | 1 | 1 | 1 | 1 | 1 | 1 | 1 | 1 |
| | Anti-aging agent (NOCRAC 6C) | 1 | 1 | 1 | 1 | 1 | 1 | 1 | 1 | 1 | 1 |
| | Silane Compound 1 (VNB-SSi) | 3.2 | 0 | 0 | 0 | 4 | 0 | 0 | 3 | 0 | 0 |
| | Anther Silane Compound (Si69) | 0 | 0 | 3.2 | 3.2 | 0 | 0 | 4 | 0 | 3 | 3 |
| | Protein-modifying agent 1 (urea) | 1 | 0 | 0 | 1 | 1.25 | 0 | 1.25 | 0.94 | 0 | 0.94 |
| | Silane Coupling Agent Composition 1 | 0 | 7.4 | 0 | 0 | 0 | 0 | 0 | 0 | 0 | 0 |
| | Silane Coupling Agent Composition2 | 0 | 0 | 0 | 0 | 0 | 9.25 | 0 | 0 | 0 | 0 |
| | Sulfur (5% oil treated) | 2.76 | 2.76 | 2 | 2 | 2.95 | 2.95 | 2 | 2.71 | 2 | 2 |
| | Vulcanization accelerator (NOCCELER CZ) | 1 | 1 | 1 | 1 | 1 | 1 | 1 | 1 | 1 | 1 |
| | Vulcanization accelerator (NOCCELER D) | 0.5 | 0.5 | 0.5 | 0.5 | 0.5 | 0.5 | 0.5 | 0.5 | 0.5 | 0.5 |
| Viscosity | ML1 + 4 100° C. (index) | 92 | 100 | 100 | 96 | 96 | 100 | 100 | 92 | 100 | 92 |
| Hardness | JIS-A Hardness | 105 | 106 | 100 | 102 | 103 | 104 | 100 | 106 | 100 | 102 |
| Viscoelasticity | tanδ(0° C.) (index) | 95 | 92 | 100 | 97 | 91 | 93 | 100 | 95 | 100 | 99 |
| | tanδ(60° C.) (index) | 71 | 73 | 100 | 85 | 83 | 88 | 100 | 80 | 100 | 91 |
| | tanδ(0° C.)/ tanδ(60° C.) (index) | 133 | 126 | 100 | 114 | 110 | 107 | 100 | 119 | 100 | 109 |
| Scorch Resistance | T5 125° C.(index) | 174 | 185 | 100 | 91 | 287 | 186 | 100 | 143 | 100 | 96 |

From the results of Examples 5-1 to 5-5 and Comparative Examples 5-1 to 5-5, a rubber composition containing a silane coupling agent (Silane Compound 1), a protein modifying agent (urea), carbon black and natural rubber shows decrease in viscosity and improvement in scorch resistance, and further shows improvement in hardness and viscoelasticity of the rubber sheets. Therefore, it has been found that the use of the rubber compositions of the present invention improves the processability of the rubber and can produce a tire having excellent steering stability and excellent balance between wet grip and low fuel consumption in practical use.

The invention claimed is:

1. A silane coupling agent composition comprising a silane compound represented by Formula (1):

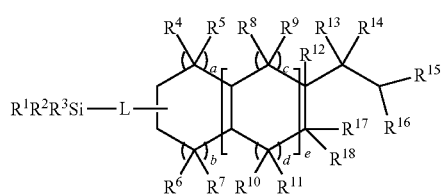

wherein
R$^1$, R$^2$, and R$^3$ each independently represents a hydrocarbon group optionally containing an oxygen atom or a nitrogen atom, or a hydrogen atom;
L represents a hydrocarbon group optionally containing at least one hetero atom selected from the group consisting of nitrogen, oxygen, and sulfur;
a is an integer of 0 or 1;
b is an integer of 0 or 1;
c is each independently an integer of 0 or 1;
d is each independently an integer of 0 or 1;
e is an integer from 0 to 5;
R$^4$, R$^5$, R$^6$, and R$^7$ represent a hydrogen atom, a methyl group or an alkyl group having 2 to 10 carbon atoms, or one of R$^4$ or R$^5$ and R$^6$ or R$^7$ may form a cross-linked structure represented by —(CH$_2$)$_f$—; and f is an integer from 1 to 5;
R$^8$, R$^9$, R$^{10}$ and R$^{11}$ represent a hydrogen atom, a methyl group or an alkyl group having 2 to 10 carbon atoms, or one of R$^8$ or R$^9$ and R$^{10}$ or R$^{11}$ may form a cross-linked structure represented by —(CH$_2$)$_g$—; and g is an integer from 1 to 5;
R$^{16}$ is a hydrogen atom, a methyl group or an alkyl group having 2 to 8 carbons, and R$^{17}$ is a hydrogen atom, a methyl group or an alkyl group having 2 to 10 carbons, where R$^{12}$ and R$^{13}$ bond to each other to form a double bond, and R$^{14}$, R$^{15}$, and R$^{18}$ are a hydrogen atom, a methyl group or an alkyl group having 2 to 10 carbons or R$^{14}$ and R$^{15}$ bond to each other to form a double bond, and R$^{12}$, R$^{13}$, and R$^{18}$ are a hydrogen atom, a methyl group or an alkyl group having 2 to 10 carbons;
or
R$^{16}$ and R$^{17}$ may bond to each other to form a 4 to 9 membered alicyclic hydrocarbon, where R$^{14}$ and R$^{15}$ bond to each other to form a double bond, and R$^{12}$, R$^{13}$, and R$^{18}$ are a hydrogen atom, a methyl group or an alkyl group having 2 to 10 carbons; and
a protein modifying agent.

2. The silane coupling agent composition according to claim 1, wherein the silane compound is a compound represented by Formula (2):

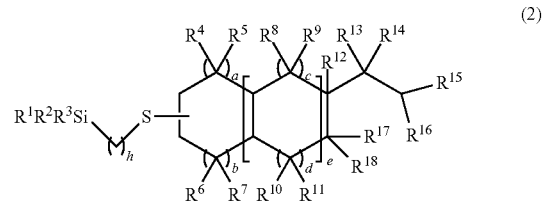

wherein
R$^1$, R$^2$, and R$^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
R$^4$, R$^5$, R$^6$, and R$^7$ represent a hydrogen atom, a methyl group or an alkyl group having 2 to 10 carbon atoms, or one of R$^4$ or R$^5$ and R$^6$ or R$^7$ may form a cross-linked structure represented by —(CH$_2$)$_f$—; and f is an integer from 1 to 5;
R$^8$, R$^9$, R$^{10}$ and R$^{11}$ represent a hydrogen atom, a methyl group or an alkyl group having 2 to 10 carbon atoms, or one of R$^8$ or R$^9$ and R$^{10}$ or R$^{11}$ may form a cross-linked structure represented by —(CH$_2$)$_g$—; and g is an integer from 1 to 5;
R$^{16}$ is a hydrogen atom, a methyl group or an alkyl group having 2 to 8 carbons, and R$^{17}$ is a hydrogen atom, a methyl group or an alkyl group having 2 to 10 carbons, where R'2 and R$^{13}$ bond to each other to form a double bond, and R$^{14}$, R$^{15}$, and R$^{18}$ are a hydrogen atom, a methyl group or an alkyl group having 2 to 10 carbons or R$^{14}$ and R$^{15}$ bond to each other to form a double bond, and R$^{12}$, R$^{13}$, and R$^{18}$ are a hydrogen atom, a methyl group or an alkyl group having 2 to 10 carbons;
or
R$^{16}$ and R$^{17}$ may bond to each other to form a 4 to 9 membered alicyclic hydrocarbon, where R$^{14}$ and R$^{15}$ bond to each other to form a double bond, and R$^{12}$, R$^{13}$, and R$^{18}$ are a hydrogen atom, a methyl group or an alkyl group having 2 to 10 carbons.

3. The silane coupling agent composition according to claim 1, wherein the silane compound is a compound represented by Formula (3):

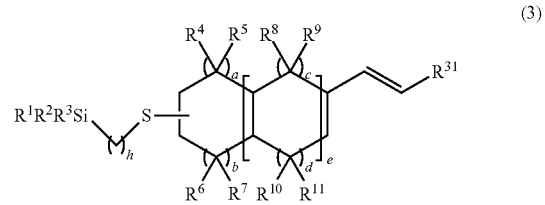

wherein
R$^1$, R$^2$, and R$^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;

c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and
$R^{31}$ is a hydrogen atom, a methyl group, or an alkyl group having 2 to 8 carbon atoms.

4. The silane coupling agent composition according to claim 1, wherein the silane compound is a compound represented by Formula (4):

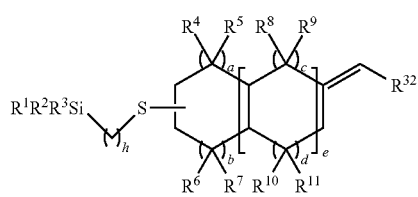

(4)

wherein
$R^1$, $R^2$, and $R^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5; and
$R^{32}$ is a hydrogen atom, a methyl group, or an alkyl group having 2 to 9 carbon atoms.

5. The silane coupling agent composition according to claim 1, wherein the silane compound is a compound represented by Formula (5):

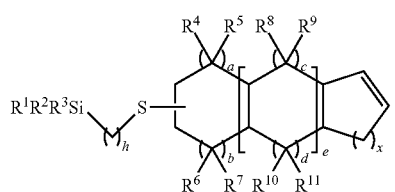

(5)

wherein
$R^1$, $R^2$, and $R^3$ each independently represents a hydrocarbon group optionally containing an oxygen atom or a nitrogen atom, or a hydrogen atom;
h is an integer of 1 to 10;
a is an integer of 0 or 1;
b is an integer of 0 or 1;
c is each independently an integer of 0 or 1;
d is each independently an integer of 0 or 1;
e is an integer from 0 to 5;
$R^4$, $R^5$, $R^6$, and $R^7$ represent a hydrogen atom, a methyl group or an alkyl group having 2 to 10 carbon atoms, or one of $R^4$ or $R^5$ and $R^6$ or $R^7$ may form a cross-linked structure represented by —$(CH_2)_f$—; and f is an integer from 1 to 5;
$R^8$, $R^9$, $R^{10}$ and $R^{11}$ represent a hydrogen atom, a methyl group or an alkyl group having 2 to 10 carbon atoms, or one of $R^8$ or $R^9$ and $R^{10}$ or $R^{11}$ may form a cross-linked structure represented by —$(CH_2)_g$—; and g is an integer from 1 to 5 and x is an integer from 0 to 5.

6. The silane coupling agent composition according to claim 1, wherein the silane compound is a compound represented by
Formula (6):

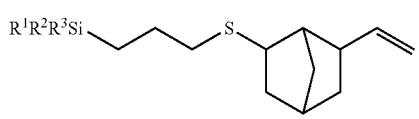

(6)

wherein $R^1$, $R^2$, and $R^3$ each independently represents a hydrocarbon group optionally containing an oxygen atom or a nitrogen atom, or a hydrogen atom; or
Formula (7):

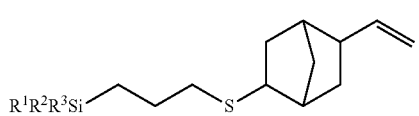

(7)

wherein $R^1$, $R^2$, and $R^3$ each independently represents a hydrocarbon group optionally containing an oxygen atom or a nitrogen atom, or a hydrogen atom; or
Formula (8):

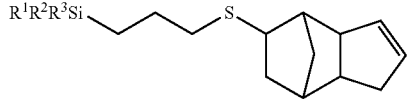

(8)

wherein $R^1$, $R^2$, and $R^3$ each independently represents a hydrocarbon group optionally containing an oxygen atom or a nitrogen atom, or a hydrogen atom; or
Formula (9):

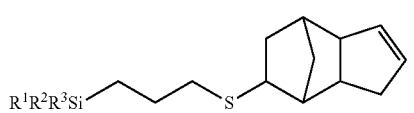

(9)

wherein R¹, R², and R³ each independently represents a hydrocarbon group optionally containing an oxygen atom or a nitrogen atom, or a hydrogen atom.

7. The silane coupling agent composition according to claim 1, wherein the $R^1R^2R^3Si$ group of the silane compound has a chemical structure represented by Formula (10):

$$(R^{19}(L^1)_j)_k R^{20}{}_{(3-k)}Si{\diagdown}_* \qquad (10)$$

wherein
$R^{19}$ each independently represents an alkoxy group or an amino group substituted with one or more alkyl groups;
$R^{20}$ each independently represents a hydrogen atom or an alkyl group;
$L^1$ each independently represents a hydrocarbon group optionally including at least one hetero atom selected from the group consisting of nitrogen, oxygen, and sulfur;
j is each independently an integer of 0 or 1;
k is an integer of 1 to 3; and
an asterisk (*) indicates a region bonded to a moiety other than a silyl group of the sulfur-containing silane compound.

8. The silane coupling agent composition according to claim 1, wherein the $R^1R^2R^3Si$ group of the silane compound is a triethoxysilyl group.

9. The silane coupling agent composition according to claim 1, wherein the protein modifying agent is at least one selected from the group consisting of a carbamide compound, a guanidine compound, and a surfactant.

10. The silane coupling agent composition according to claim 9, wherein the silane coupling agent composition contains a carbamide compound and a guanidine compound, and the ratio of the content of the guanidine compound to the content of the carbamide compound is 0.01 to 3.

11. The silane coupling agent composition according to claim 9, wherein the carbamide compound is urea.

12. The silane coupling agent composition according to claim 9, wherein the guanidine compound is at least one selected from the group consisting of a guanidine hydrochloride and a diphenylguanidine.

13. The silane coupling agent composition according to claim 9, wherein the surfactant is sodium dodecyl sulfate.

14. The silane coupling agent composition according to claim 1, further comprising carbon black.

15. The silane coupling agent composition according to claim 1, further comprising a silane compound other than the compound represented by formula (1).

16. The silane coupling agent composition according to claim 15, wherein the silane compound other than the compound represented by Formula (1) is a silane compound represented by Formula (11):

$$(R^{21}(L^2)_w)_q R^{22}{}_{(3-q)}Si{\diagdown}_t S_u {\diagdown}_v Si(R^{23}(L^3)_z)_r R^{24}{}_{(3-r)} \qquad (11)$$

wherein
t and v are each independently an integer from 0 to 10;
u is an integer from 2 to 10;
q and r are each independently an integer from 1 to 3;
w and z are each independently an integer of 0 or 1;
$L^2$ and $L^3$ are each independently a hydrocarbon group optionally containing at least one hetero atom selected from the group consisting of nitrogen, oxygen, and sulfur;
$R^{21}$ and $R^{23}$ are each independently an alkoxy group or an amino group substituted with one or more alkyl groups; and
$R^{22}$ and $R^{24}$ are each independently hydrogen atom or an alkyl group.

17. The silane coupling agent composition according to claim 15, wherein the proportion of the content of the silane compound other than the compound represented by Formula (1) in the silane coupling agent composition with respect to the total content of the silane compound in the silane coupling agent composition is 0.1 to 0.9 on a mass basis.

18. A rubber composition comprising the silane coupling agent composition according to claim 1, at least one elastomer having a glass transition point of 25° C. or less selected from the group consisting of natural rubber and deproteinized natural rubber, and an inorganic material.

19. The rubber composition according to claim 18, wherein the content of the protein modifying agent in the rubber composition is 0.01 to 10 parts by mass with respect to 100 parts by mass of the elastomer.

20. A method for producing the rubber composition according to claim 18, comprising
the step of kneading the silane compound, the protein modifying agent, the elastomer, and the inorganic material, and
the step of prekneading the protein modifying agent and the elastomer prior to the step of kneading the silane compound, the protein modifying agent, the elastomer, and the inorganic material.

21. A cross-linked product of the rubber composition according to claim 18.

22. A tire comprising the cross-linked product according to claim 21.

* * * * *